(12) United States Patent
Tsuruoka

(10) Patent No.: US 7,595,825 B2
(45) Date of Patent: Sep. 29, 2009

(54) IMAGE PICKUP SYSTEM AND IMAGE PROCESSING PROGRAM

(75) Inventor: Takao Tsuruoka, Machida (JP)

(73) Assignee: Olympus Corporation, Tokyo (JP)

(*) Notice: Subject to any disclaimer, the term of this patent is extended or adjusted under 35 U.S.C. 154(b) by 528 days.

(21) Appl. No.: 11/447,771

(22) Filed: Jun. 6, 2006

(65) Prior Publication Data
US 2006/0227227 A1    Oct. 12, 2006

Related U.S. Application Data

(63) Continuation of application No. PCT/JP2004/018027, filed on Dec. 3, 2004.

(30) Foreign Application Priority Data

Dec. 9, 2003    (JP)    ............................. 2003-410884

(51) Int. Cl.
*H04N 5/217*   (2006.01)
*H04N 5/00*    (2006.01)
*H04N 5/33*    (2006.01)
*H04N 5/225*   (2006.01)
*H04N 5/335*   (2006.01)

(52) U.S. Cl. .................. 348/241; 382/167; 382/274; 382/169; 348/607; 348/608

(58) Field of Classification Search .................. 348/239, 348/241, 242, 451, 607; 382/167, 102
See application file for complete search history.

(56) References Cited

U.S. PATENT DOCUMENTS

| | | | |
|---|---|---|---|
| 5,418,574 A | * | 5/1995 | Miyabata et al. ............ 348/625 |
| 6,697,107 B1 | * | 2/2004 | Hamilton et al. ............. 348/234 |
| 2001/0016064 A1 | * | 8/2001 | Tsuruoka et al. ............. 382/167 |
| 2002/0196355 A1 | | 12/2002 | Hiroshige et al. |
| 2003/0048368 A1 | | 3/2003 | Bosco et al. |
| 2004/0027469 A1 | | 2/2004 | Tsuruoka |
| 2005/0001907 A1 | * | 1/2005 | Hoshuyama ............. 348/222.1 |

FOREIGN PATENT DOCUMENTS

| | | |
|---|---|---|
| EP | 1 289 309 A1 | 3/2003 |
| JP | 2001-157057 A | 6/2001 |
| JP | 2001-175843 A | 6/2001 |

(Continued)

*Primary Examiner*—Tuan V Ho
*Assistant Examiner*—Selam T Gebriel
(74) *Attorney, Agent, or Firm*—Frishauf, Holtz, Goodman & Chick, P.C.

(57) ABSTRACT

An image pickup system includes a color noise estimation section, which has a local region extraction section that extracts luminance and color difference signals in units of 4×4 pixels from signals of a CCD with a color filter, an average luminance calculation section that calculates an average luminance value from the luminance signals, a temperature estimation section that estimates a temperature T of the CCD from a signal of an OB region, a gain calculation section that calculates a gain G of the signals based on information from a control section, a coefficient and a function calculation sections for estimating a color noise amount from the average luminance value based on a formulation using the temperature and the gain, and a color noise reducing section that reduces color noise in the color difference signals in units of 4×4 pixels based on the estimated color noise amount.

26 Claims, 14 Drawing Sheets

FOREIGN PATENT DOCUMENTS

| | | |
|---|---|---|
| JP | 2003-61105 A | 2/2003 |
| JP | 2003-153290 A | 5/2003 |
| JP | 2004-72422 A | 3/2004 |
| JP | 2004-88149 A | 3/2004 |
| JP | 2004-128985 A | 4/2004 |
| JP | 2005-20562 A | 1/2005 |
| JP | 2005-25448 A | 1/2005 |

* cited by examiner

FIG.3

| $R_1$ | $G_1$ | $R_2$ | $G_2$ |
|---|---|---|---|
| $G_3$ | $B_1$ | $G_4$ | $B_2$ |
| $R_3$ | $G_5$ | $R_4$ | $G_6$ |
| $G_7$ | $B_3$ | $G_8$ | $B_4$ |

FIG.12A

| $C_1$ | $Y_1$ | $C_2$ | $Y_2$ |
|---|---|---|---|
| $G_1$ | $M_1$ | $G_2$ | $M_2$ |
| $C_3$ | $Y_3$ | $C_4$ | $Y_4$ |
| $M_3$ | $G_3$ | $M_4$ | $G_4$ |
|  |  |  |  |

LINE 1 (rows 1–2), LINE 3 (rows 3–4)

ODD NUMBER FIELD

FIG.12B

|  |  |  |  |
|---|---|---|---|
| $G_1$ | $M_1$ | $G_2$ | $M_2$ |
| $C_3$ | $Y_3$ | $C_4$ | $Y_4$ |
| $M_3$ | $G_3$ | $M_4$ | $G_4$ |
| $C_5$ | $Y_5$ | $C_6$ | $Y_6$ |

LINE 2 (rows 2–3), LINE 4 (rows 4–5)

EVEN NUMBER FIELD

IMAGE PICKUP SYSTEM AND IMAGE PROCESSING PROGRAM

CROSS REFERENCE TO RELATED APPLICATION

This application is a continuation application of PCT/JP2004/018027 filed on Dec. 3, 2004 and claims benefit of Japanese Application No. 2003-410884 filed in Japan on Dec. 9, 2003, the entire contents of which are incorporated herein by this reference.

BACKGROUND OF THE INVENTION

1. Field of the Invention

The present invention relates to an image pickup system and an image processing program, and more particularly to an image pickup system and an image processing program which reduce random noise and the like in color signals due to an image sensor system.

2. Description of the Related Art

Generally noise components are contained in digitalized signals obtained from an image sensor and its analog circuit and A/D converter, and these noise components can be broadly classified into fixed pattern noise and random noise.

The fixed pattern noise is typically represented by defective pixels and mainly originates in the image sensor.

On the other hand, the random noise is generated in the image sensor and the analog circuit and has characteristics similar to the characteristics of white noise.

In regard to the latter of these, i.e., random noise, Japanese Patent Application Laid-open No. 2001-157057 discloses a technique in which a noise amount N is formulated by a function $N=ab^{cD}$ where reference symbols a, b, and c denote statically given constant terms and the signal level D is a converted into a density value, the noise amount N is estimated with respect to the signal level D from this function, and the filtering frequency characteristics are controlled based on the estimated noise amount N. As a result, adaptively noise reduction processing is performed with respect to the signal level.

Also, Japanese Patent Application Laid-open No. 2001-175843 as another example discloses a technique in which the input signals are separated into luminance signals and color difference signals, then edge intensity is determined based on these luminance signals and color difference signals, and a smoothing process is carried out in the color difference signals for regions other than the edge portions. Thus, color noise reduction processing is carried out in flat regions.

However, since the luminance noise amount varies dynamically according to factors such as the temperature at the time of shooting, the exposure time, the gain and the like, a technique using static constant terms such as that described in Japanese Patent Application Laid-open No. 2001-157057 cannot formulate into a function that matches the noise amount at the time of shooting and lacks accuracy in estimating the noise amount. Furthermore, although the filtering frequency characteristics are controlled from the noise amount, this filtering is carried out uniformly without distinguishing between flat regions and edge regions, and therefore the edge deteriorate in regions estimated that the noise amount is large from the signal level. That is, there are problems in that there is no capacity for handling processing that distinguishes the original signals and the noise and there is poor maintainability of the original signals. Further still, the technique described in the aforementioned application has no capacity for handling color noise produced between color signals.

Also, although the technique described in Japanese Patent Application Laid-open No. 2001-175843 carries out a smoothing process on color difference signals in flat regions except for the edge regions, this smoothing process is carried out fixedly. However, since the color noise amounts vary depending on the signal levels, optimal control of this smoothing process cannot be achieved. Thus, there is a likelihood that color noise components will remain and the original signals will deteriorate.

The present invention has been devised in light of these circumstances and it is an object thereof to provide an image pickup system and an image processing program capable of reducing color noise with high accuracy and optimized to the shooting conditions and producing high quality images.

SUMMARY OF THE INVENTION

An image pickup system of the present invention is an image pickup system for reducing noise contained in signals from an image sensor, in front of which is arranged a color filter, and comprises: calculation means for calculating luminance signals and color difference signals from the signals in each of predetermined unit regions, calculating an average luminance value based on the calculated luminance signals, and calculating an average color difference value based on the calculated color difference signals; color noise estimation means for estimating a color noise amount for each predetermined unit region, and color noise reducing means for reducing color noise in the color difference signals based on the color noise amount for each predetermined unit region.

Also, an image processing program of the present invention is a program for having a computer executing: a calculation procedure for calculating luminance signals and color difference signals for each predetermined unit region from signals from an image sensor, in front of which is arranged a color filter, calculating an average luminance value based on the calculated luminance signals, and calculating an average color difference value based on the calculated color difference signals; a color noise estimation procedure for estimating a color noise amount for each predetermined unit region, and a color noise reducing procedure for reducing color noise in the color difference signals based on the color noise amount for each predetermined unit region.

BRIEF DESCRIPTION OF THE DRAWINGS

FIG. 3 illustrates an arrangement of a Bayer-type color filter according to embodiment 1.

FIG. 12A and FIG. 12B illustrate an arrangement of a color-difference line-sequential-type color filter according to embodiment 2.

The following is a description of embodiments of the present invention with reference to the accompanying diagrams.

DETAILED DESCRIPTION OF THE PREFERRED EMBODIMENT(S)

Embodiment 1

Figure 1:
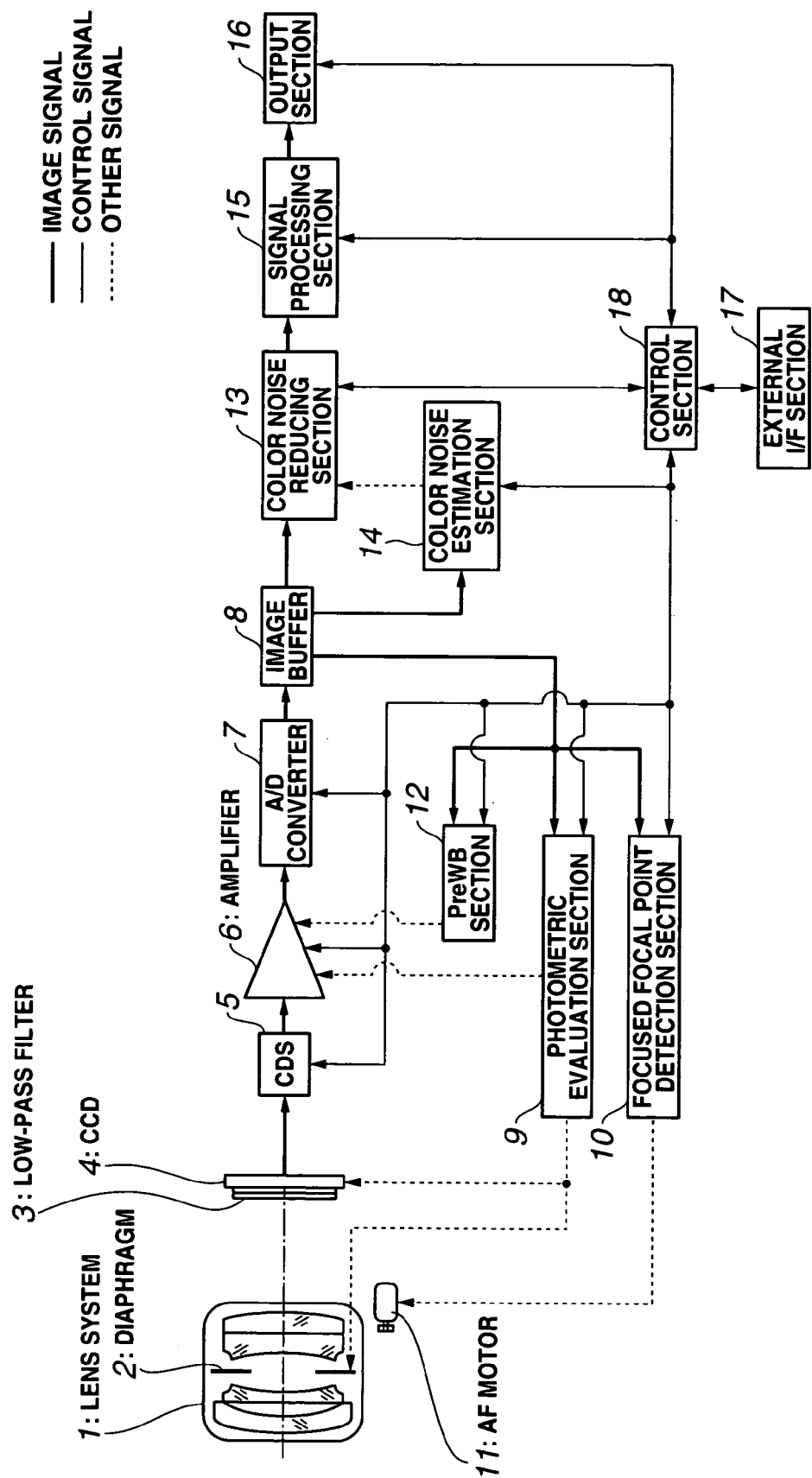
FIG. 1 is a block diagram illustrating a configuration of an image pickup system according to embodiment 1 of the present invention.
Figure 2:
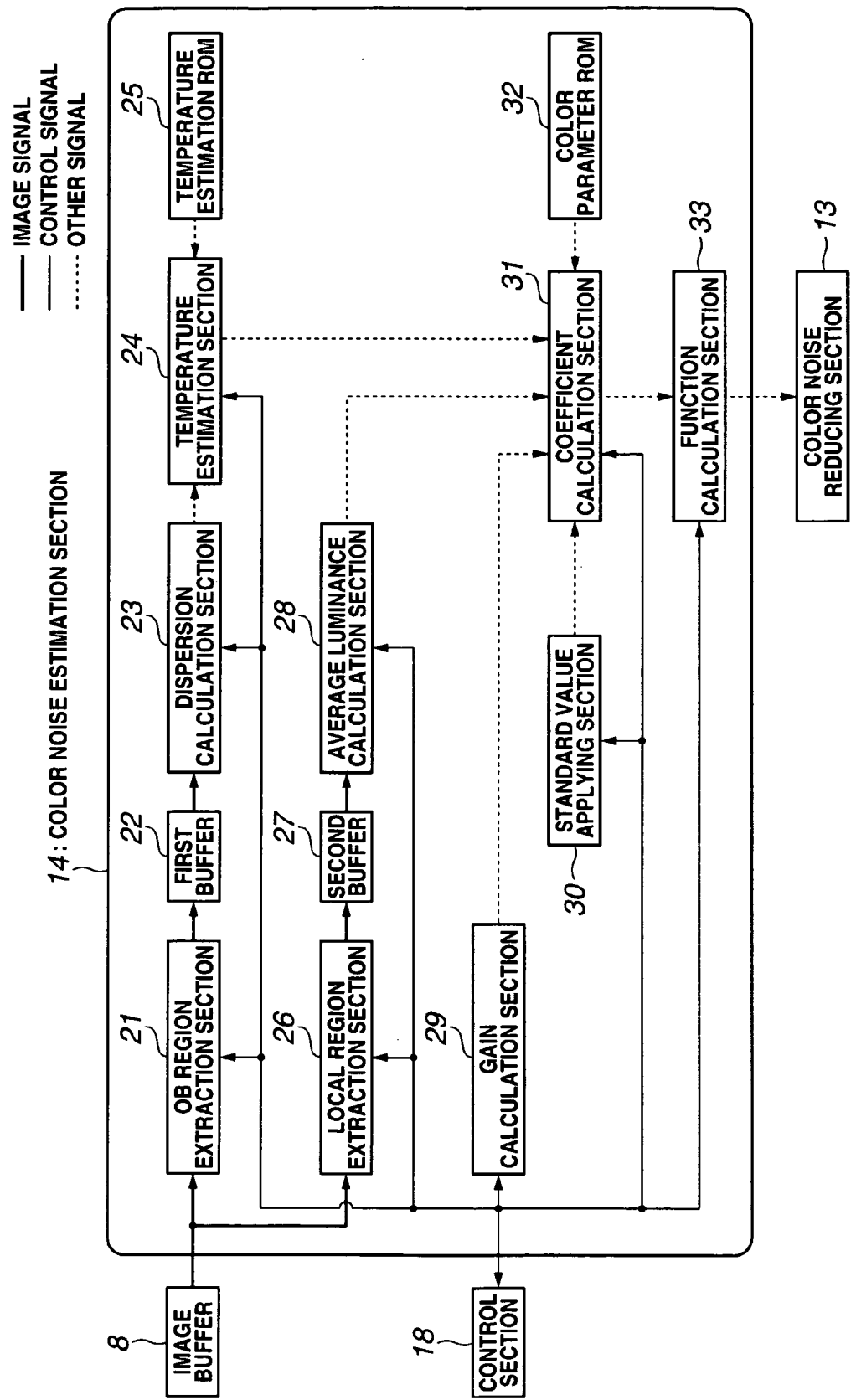
FIG. 2 is a block diagram illustrating a configuration of a color noise estimation section according to embodiment 1.
Figure 3:
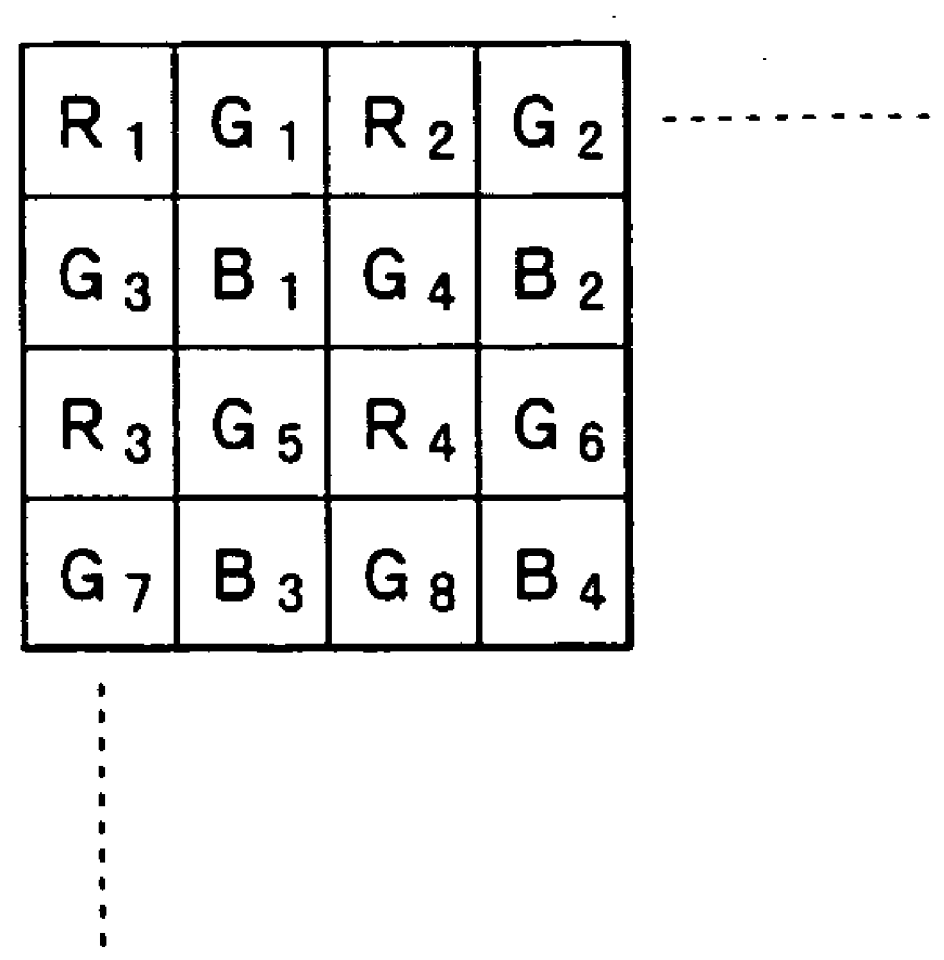
Figure 4:
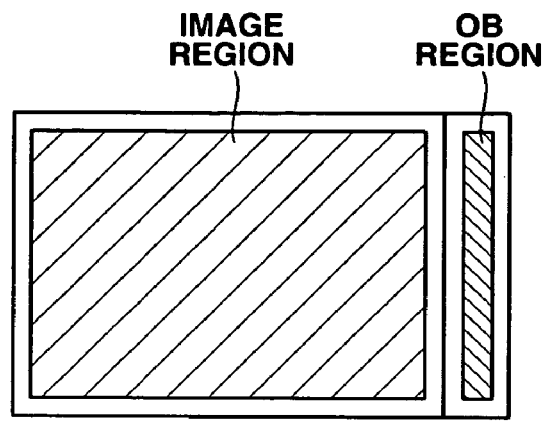
FIG. 4 illustrates an arrangement example of an OB region in an image sensor of embodiment 1.
Figure 5:
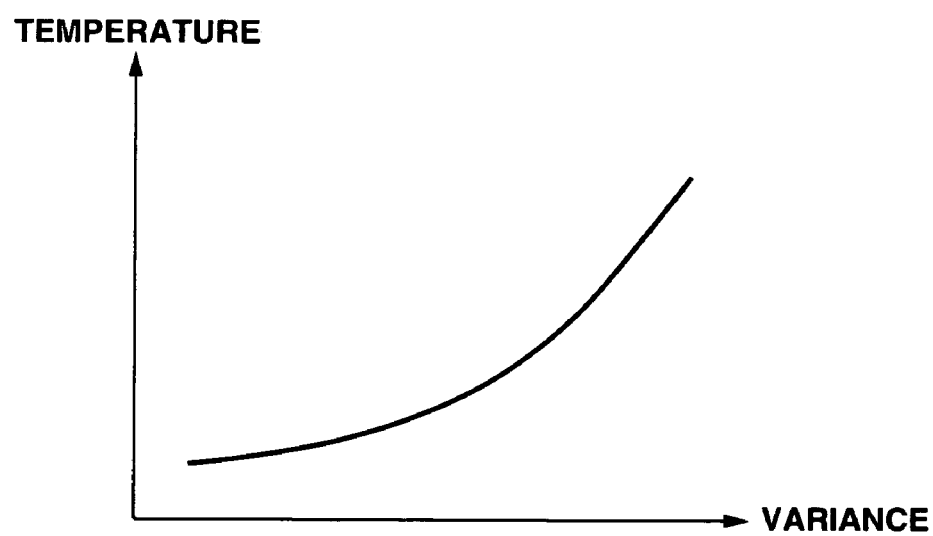
FIG. 5 is a diagram illustrating a relationship between OB region variance and image sensor temperature in embodiment 1.
Figure 6A:
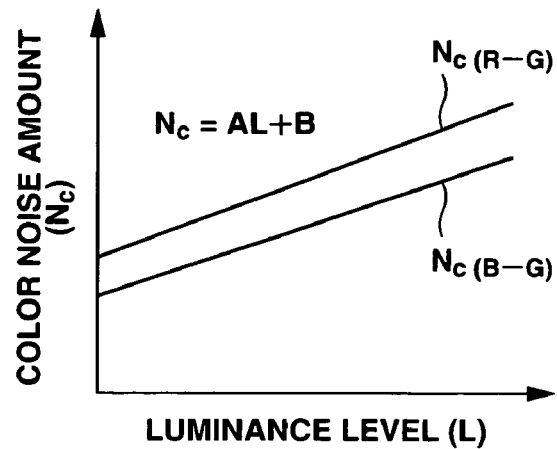
FIG. 6A and FIG. 6B are a diagram for describing formulation of color noise amount in embodiment 1.
Figure 6B:
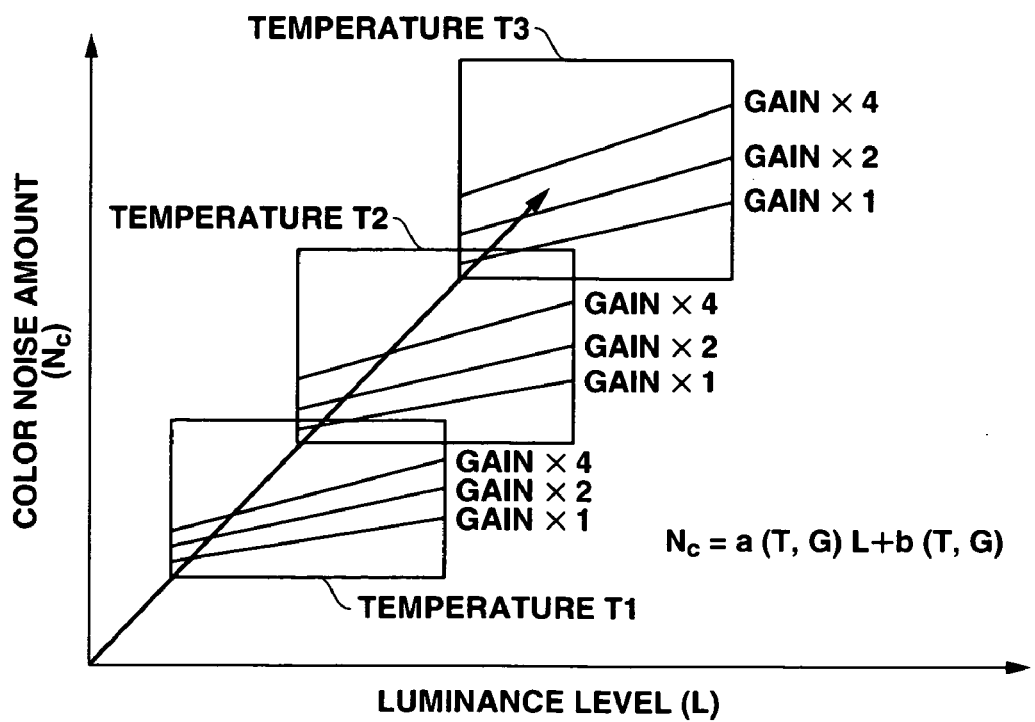
Figure 7A:
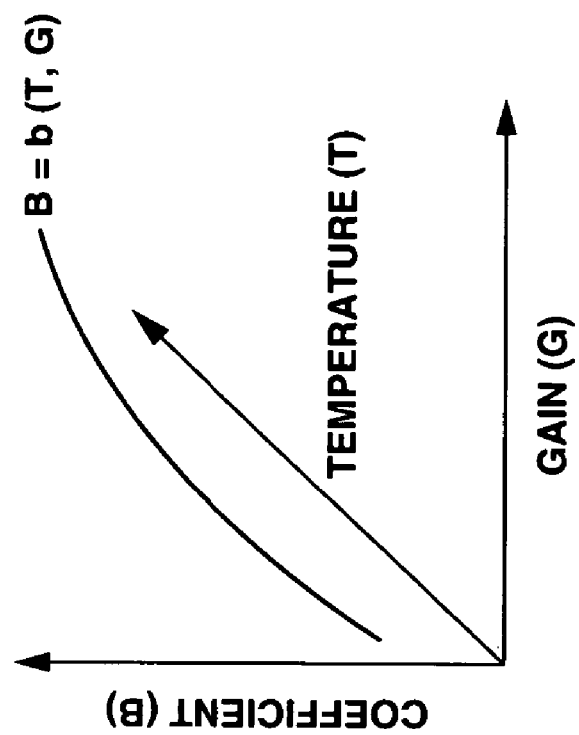
FIG. 7A and FIG. 7B are a diagram for describing parameters used in calculating color noise amounts in embodiment 1.
Figure 7B:
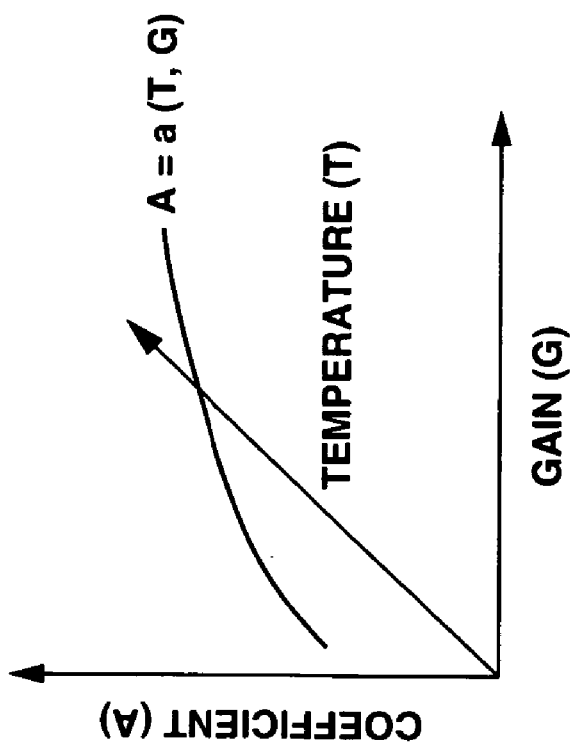
Figure 8:
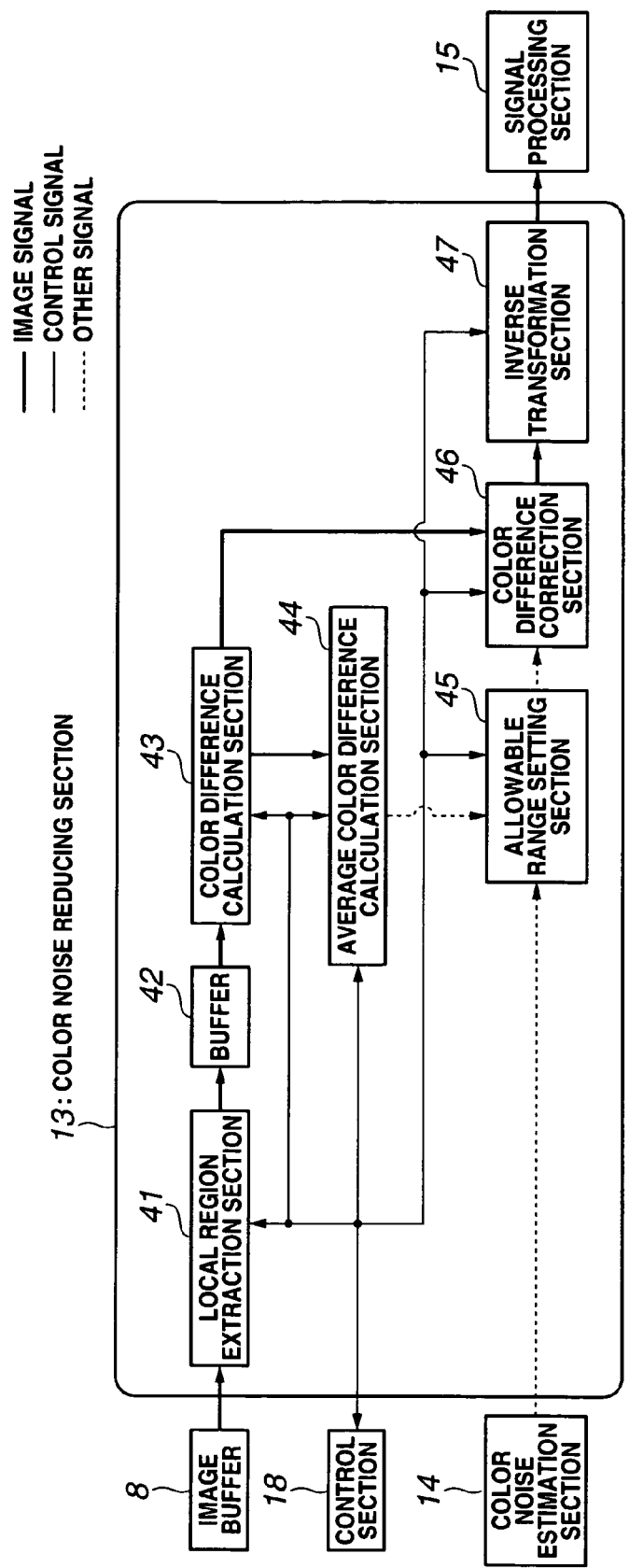
FIG. 8 is a block diagram illustrating a configuration of a color noise reducing section in embodiment 1.
Figure 9:
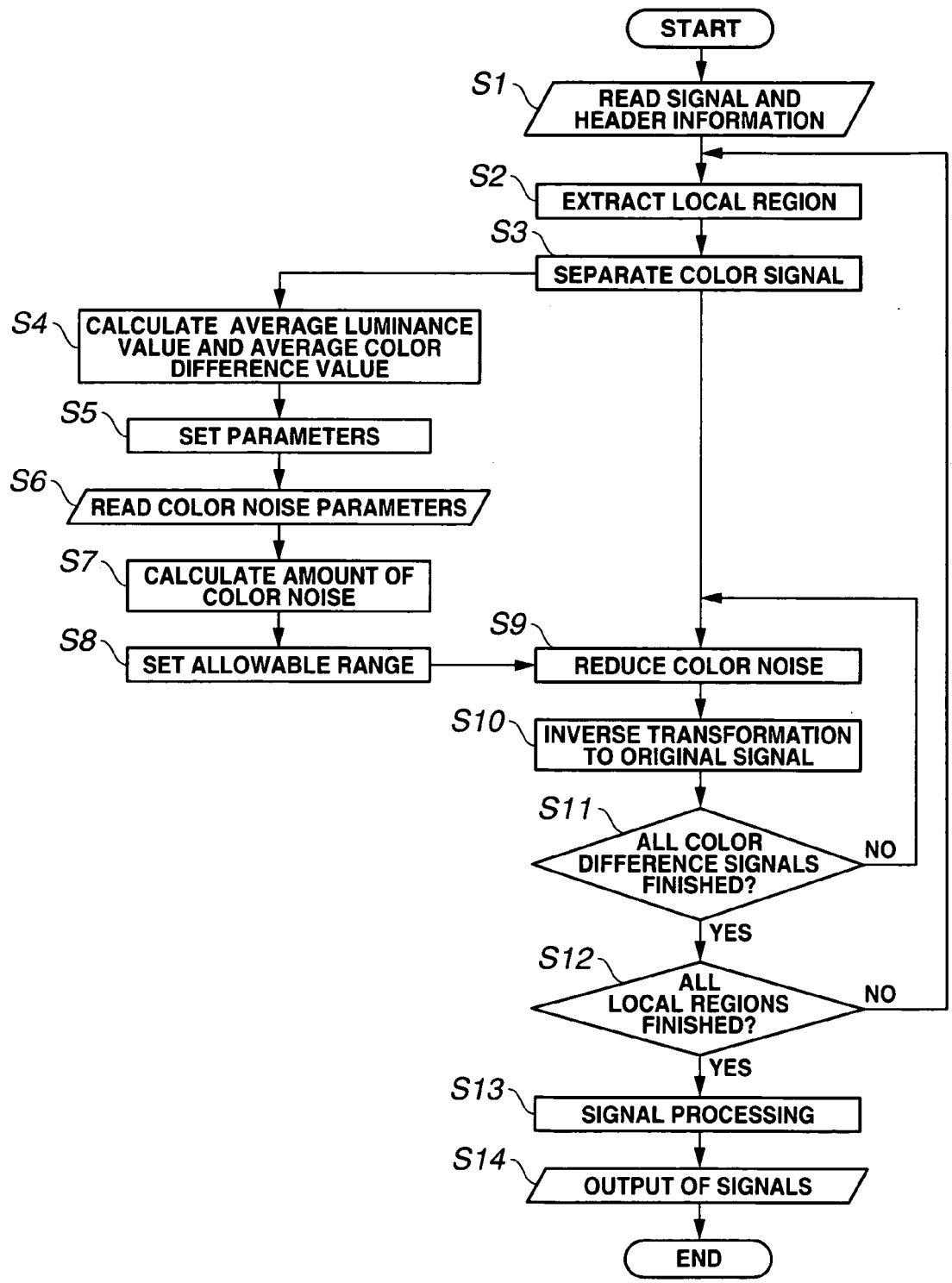
FIG. 9 is a flow chart illustrating a color noise reducing process carried out by an image processing program in a computer according to embodiment 1.

FIGS. 1 to 9 illustrate embodiment 1 of the present invention. FIG. 1 is a block diagram illustrating a configuration of an image pickup system, FIG. 2 is a block diagram illustrating a configuration of a color noise estimation section, FIG. 3 illustrates an arrangement of a Bayer-type color filter, FIG. 4 illustrates an arrangement example of an OB region in an image sensor, FIG. 5 is a diagram illustrating an example of a relationship between OB region variance and image sensor temperature, FIG. 6A and FIG. 6B are a diagram for describing formulation of color noise amount, FIG. 7A and FIG. 7B are a diagram for describing parameters used in calculating color noise amounts, FIG. 8 is a block diagram illustrating a configuration of a color noise reducing section, and FIG. 9 is a flow chart illustrating a color noise reducing process carried out by an image processing program in a computer.

As shown in FIG. 1, the image pickup system comprises a lens system 1 for forming an image of a subject, an aperture 2 that is arranged inside the lens system 1 and is for prescribing a range of passage of a luminous flux in the lens system 1, a low-pass filter 3 for eliminating unnecessary high frequency components from luminous flux which has been formed into an image by the abovementioned lens system 1, a CCD 4 that photoelectrically converts the optical image of a subject formed via the low-pass filter 3 and outputs an electric image signal, for example, an image sensor such as a single CCD having a primary color filter arranged in front, a CDS (correlated double sampling) 5 that carries out correlated double sampling on the image signal that is output from the CCD 4, an amplifier 6 that amplifies the signal outputted from the CDS 5, an A/D converter 7 that converts the analog image signal amplified by the amplifier 6 to a digital signal, an image buffer 8 that temporarily stores the digital image data that is output from the A/D converter 7, an exposure control section 9 that carries out photometric evaluation relating to the image of a subject based on the image data stored in the image buffer 8 and carries out control of the aperture 2, the CCD 4, and the amplifier 6 based on an evaluation result thereof, a focus control section 10 which detects the focal point based on the image data stored in the abovementioned image buffer 8, and which controls an AF motor 11, which is described later, based on the results of detection, an AF motor 11 that is controlled by the focus control section 10 and drives a component such as a focus lens contained in the lens system 1, a pre-white balance (PreWB) section 12 that carries out white balance adjustment during pre-image capture mode in such ways as varying the rate of amplification for each color by the amplifier 6 based on the image data stored in the image buffer 8, a color noise estimation section 14 constituting color noise estimation means which performs color noise estimation in a manner that is described in detail later based on image data stored in the image buffer 8, a color noise reducing section 13, which is color noise reducing means for reducing color noise in the image data read out from the image buffer 8 using an estimation result of the color noise estimation section 14, a signal processing section 15 that executes various types of signal processing on the image data outputted from the color noise reducing section 13, an output section 16 that outputs the image data from the signal processing section 15 for recording on a memory card for example, an external I/F section 17 provided with an interface for such components as a power switch, a shutter button, and a mode switch for switching between various photographing modes, and a control section 18 constituting a parameter calculation means and a control means comprising a microcomputer or the like which is bidirectionally connected to the CDS 5, the amplifier 6, the A/D converter 7, the exposure control section 9, the focus control section 10, the PreWB section 12, the color noise reducing section 13, the color noise estimation section 14, the signal processing section 15, the output section 16, and the external I/F section 17, so that the control section 18 comprehensively controls the image pickup system containing these connected sections.

Next, a flow of signals in the image pickup system shown in FIG. 1 is described.

The image pickup system is configured to be able to set shooting conditions such as ISO speed via the external I/F section 17, and after these settings have been made, the pre-image-pickup mode is entered by half pressing a shutter button formed by a two stage press button switch.

The image signal, which is shot by the CCD 4 via the lens system 1, the aperture 2, and the low-pass filter 3 and then outputted, undergoes commonly known correlated double sampling in the CDS 5 and outputted as an analog signal.

It should be noted that in the present embodiment, the CCD 4 is a single CCD having a primary color filter arranged in front, and the color filter is described using a Bayer-type arrangement as shown in FIG. 3 as an example.

A configuration of a Bayer-type color filter is described with reference to FIG. 3.

A Bayer type has a 2×2 pixel array as a basic unit with green (G) color filters arranged in two pixels diagonally and a red (R) color filter and a blue (B) color filter arranged diagonally in the remaining pixels.

The analog signal from the CDS 5 is amplified by a predetermined amount by the amplifier 6, converted to a digital signal by the A/D converter 7, then transferred to the image buffer 8.

After this, the image signals inside the image buffer 8 are transferred to the exposure control section 9, the focus control section 10, and the pre-white balance section 12.

The exposure control section 9 determines the luminance level of the image, and controls an aperture value of the aperture 2, an electric shutter speed of the CCD 4, an amplification rate of the amplifier 6 and the like in consideration of the ISO speed and shutter speed of the limit of image stability, so that an appropriate exposure is obtained.

Furthermore, the focus control section 10 detects edge intensity in the image and obtains a focused image by controlling the AF motor 11 so as to become maximal edge intensity.

Further, the pre-white balance section 12 calculates simple white balance coefficients by multiplying each color signal by a signal with a specified luminance level in the image signal and transmits these coefficients to the amplifier 6. The amplifier 6 carries out white balance adjustment by multiplying a different gain for each color signal based on the coefficient transferred from the pre-white balance section 12.

After preparation for the main shooting is in place by carrying out the pre-image-pickup mode, the main shooting is carried out by detecting via the external I/F section 17 that the shutter button has been fully pushed.

The main shooting is carried out according to the exposure conditions determined by the exposure control section 9, the focus conditions determined by the focus control section 10, and the white balance coefficient determined by the pre-white balance section 12, and these conditions of shooting at this time are transferred to the control section 18.

When the main shooting is carried out in this way, the image signals are transferred and stored in the image buffer 8 in the same manner as during pre-image-pickup.

The image signals in the image buffer 8 are transferred to the color noise estimation section 14, furthermore, the exposure conditions determined by the exposure control section 9, the white balance coefficient determined by the pre-white balance section 12, and the shooting conditions such as the ISO speed that has been set using the external I/F section 17 are also transferred together to the color noise estimation section 14 via the control section 18.

Based on this information and the image signals, the color noise estimation section 14 calculates a color noise amount for each predetermined size, for example, in units of 4×4 pixels in the present embodiment, and transfers the calculated color noise amount to the color noise reducing section 13. The calculation of color noise amount in the color noise estimation section 14 is carried out under the control of the control section 18 in synchronization with the processing of the color noise reducing section 13.

Based on the color noise amount calculated by the color noise estimation section 14, the color noise reducing section 13 carries out color noise reduction processing on the image signals in the image buffer 8, and transfers the processed image signals to the signal processing section 15.

Under the control of the control section 18, the signal processing section 15 carries out commonly known enhancing process, compression process and the like on the image signals that have been subjected to color noise reduction processing, and transfers the thus-processed image signals to the output section 16.

The output section 16 records and saves the received image signals in a memory card or the like.

Next, an example configuration of the color noise estimation section 14 is described with reference to FIG. 2.

The color noise estimation section 14 comprises an OB region extraction section 21 that extracts a signal of an OB (optical black) region arranged on the right side of the image region of the CCD 4 as shown for example in FIG. 4 from the image signals stored in the image buffer 8 according to the control of the control section 18, a first buffer 22 that stores the signals of the OB region extracted by the OB region extraction section 21, a variance calculation section 23 constituting variance calculation means, that reads the signals of the OB region stored in the first buffer 22 to calculate a variance value, then uses information such as that relating to the exposure conditions transferred from the control section 18 to correct the variance value with respect to the amplification value of the amplifier 6, a temperature estimation ROM 25 constituting temperature estimation means in which the pre-measured relationship between the variance value and the temperature of the image sensor is recorded, a temperature estimation section 24 being a temperature estimation means and a parameter calculation means for determining the temperature of the CCD4, which is the image sensor, by referencing the temperature estimation ROM 25 based on the variance values outputted from the variance calculation section 23, a local region extraction section 26 that extracts a local region of a predetermined size in a predetermined position from the image signals stored in the image buffer 8, a second buffer 27 that stores the signals of the local region extracted by the local region extraction section 26, an average luminance calculation section 28, which is a parameter calculation means, that reads out the signals of the local region stored in the second buffer 27 and calculates an average luminance value, a gain calculation section 29 being a gain calculation means, which is parameter calculation means for calculating an amplification value of the amplifier 6 based on information such as the exposure conditions, the ISO speed, and the white balance coefficient transferred from the control section 18, a standard value applying section 30, which is applying means for applying a standard value when any parameter is omitted, a color parameter ROM 32, which is coefficient calculation means, that stores color parameters related to a function, which will be described later, used when estimating the color noise amount, a coefficient calculation section 31 being a coefficient calculation means and a color noise amount calculation means that estimates the color noise amount of the target pixel by means of the abovementioned function, on the base of information relating to the parameter read out from the color parameter ROM 32, the temperature of the image sensor outputted from the temperature estimation section 24 or the standard value applying section 30, the average luminance value outputted from the average luminance calculation section 28 or the standard value applying section 30, and the amplification amount outputted from the gain calculation section 29 or the standard value applying section 30, and a function calculation section 33 being a function calculation means and a color noise amount calculation means that uses the coefficient outputted from the coefficient calculation section 31 to calculate the color noise amount using a function formulated as will be described later, and outputs to the color noise reducing section 13.

In the present embodiment, since processing by the color noise reducing section 13, which is described later, is carried out in units of 4×4 pixels, the local region extraction section 26 carries out extraction while progressively scanning the entire area of pixels using a 4×4 pixel unit. The processing by the local region extraction section 26 is carried out synchronously with the processing of the color noise reducing section 13.

Furthermore, the control section 18 is bidirectionally connected to the OB region extraction section 21, the variance calculation section 23, the temperature estimation section 24, the local region extraction section 26, the average luminance calculation section 28, the gain calculation section 29, the standard value applying section 30, the coefficient calculation section 31, and the function calculation section 33, and is configured to control these.

A relationship between OB region variance and image sensor temperature in the temperature estimation section 24 is described with reference to FIG. 5.

As is shown in this figure, the temperature of the image sensor rises in a monotonic increases while describing a curve according to increases in the variance of the OB region.

In the case of random noise in the OB region, in which there is no incident light, dark current noise is governing factor, and this dark current noise is related to the temperature of the image sensor.

For this reason, the random noise of the OB region is calculated as a variance value and the relationship between this variance value and temperature variation of the image sensor is measured in advance and stored in the temperature estimation ROM 25. As a result, the temperature estimation section 24 can estimate the temperature of the image sensor CCD 4 from the variance values calculated by the variance calculation section 23 using corresponding relationships stored in the temperature estimation ROM 25.

On the other hand, the calculation of the average luminance value by the average luminance calculation section 28 is carried out as follows.

First, when the local region extraction section 26 carries out extraction of local regions in units of 4×4 pixels from the image signal of the CCD 4, which comprises a Bayer-type color filter as described above, block data is obtained arranged as shown in FIG. 3.

This block data of 4×4 pixels contains G signals of 8 pixels, R signals of 4 pixels, and B signals of 4 pixels. Accordingly, hereinafter, G pixels are given as $G_i$ (i=1 to 8), R pixels are given as $R_j$ (j=1 to 4), and B pixels are given as $B_k$ (k=1 to 4) and these are shown with subscripts appended respectively. The pixel positions corresponding to these subscripts at this time are as shown in FIG. 3.

The average luminance calculation section 28 uses the G signal as a signal approximating the luminance signal and calculates the average luminance as an average value $G_{AV}$ as shown in the following formula 1.

[Formula 1]

$$G_{AV} = \sum_{i=1}^{8} \frac{G_i}{8}$$

Next, the formulation of the color noise amount used when the coefficient calculation section 31 estimates the color noise amount of a target pixel is described with reference to FIG. 6A and FIG. 6B.

FIG. 6A plots color noise amounts $N_{C(R-G)}$ and $N_{C(B-G)}$ relating to two types of color difference signals (R–G) and (B–G) corresponding to luminance levels. As shown in the diagram, the color noise amounts increase linearly with respect to the luminance level.

When this variation in color noise amount is formulated using L as the luminance level and $N_C$ as the color noise amount, the following formula 2 is obtained.

$$N_C = AL + B \quad \text{[Formula 2]}$$

Here, A and B are constant terms.

However, the color noise amount $N_C$ is dependent not only on the luminance level L, but also varies due to such factors as the temperature of the image sensor CCD 4 and the gain of the amplifier 6. Accordingly, an example giving consideration to these factors is shown in FIG. 6B.

FIG. 6B plots the color noise amount with respect to the luminance level, temperature, and gain. As shown in the diagram, each curve is formed as indicated by formula 2, but the coefficient varies depending on the temperature and gain. Accordingly, when consideration is given to these and formulation is carried out setting the temperature as T and the gain as G, the following formula 3 is obtained.

$$N_C = a(T, G)L + b(T, G) \quad \text{[Formula 3]}$$

Here, a (T, G) and b (T, G) are functions that set the temperature T and the gain G as parameters.

FIG. 7A shows an overview of the characteristics of the function a (T, G) and FIG. 7B shows an overview of the characteristics of the function b (T, G).

Since these functions are two variable functions with the temperature T and the gain G as independent variables, FIGS. 6A and 6B are plotted with three dimensional coordinates and a curved surface in the plotted space. However, instead of illustrating a specific curved surface form here, the manner of variation in the characteristics is indicated broadly using a curved line.

The constant terms A and B are outputted by inputting the temperature T and the gain G as parameters in the functions a and b. Then, a specific form of these functions can be easily obtained by measuring in advance the characteristics of the image sensor including the CCD 4 and the amplifier 6.

The above-described two functions a (T, G) and b (T, G) are recorded separately in the color parameter ROM 32 for each of the two types of color difference signals (R–G) and (B–G).

The coefficient calculation section 31 calculates the coefficients A and B with the dynamically obtained (or obtained from the standard value applying section 30) temperature T and gain G as input parameters using the two functions a (T, G) and b (T, G) recorded in the color parameter ROM 32.

The function calculation section 33 determines a function form for calculating a color noise amounts $N_{C(R-G)}$ and $N_{C(B-G)}$ relating to the two types of color difference signals (R–G) and (B–G) by applying coefficients A and B calculated by the coefficient calculation section 31 in the above-described formula 3. Then, color noise amounts $N_{C(R-G)}$ and $N_{C(B-G)}$ relating to the two types of color difference signals (R–G) and (B–G) are calculated using the signal value level L outputted from the average luminance calculation section 28 via the coefficient calculation section 31.

In this way, the luminance level L used in calculating the color noise amount becomes an average value $G_{AV}$ of the G signal calculated by the average luminance calculation section 28 as shown in formula 1.

It should be noted that it is not absolutely necessary for parameters such as the temperature T and the gain G to be obtained for each shooting. For example, since the temperature T stabilizes after a fixed period of time has elapsed following the switching on the power supply, it is also possible that after this has become stable, the control section 18 can store the temperature information calculated by the temperature estimation section 24 in the standard value applying section 30, and temperature information read out from the standard value applying section 30 is used omitting subsequent calculation processing. Thus, the standard value applying section 30 is configured to set and output standard parameters when not obtaining parameters from the temperature estimation section 24, the gain calculation section 29, or the average luminance calculation section 28 and the control section 18 as necessary, and therefore reliable processing can be carried out and it is possible to achieve increased speed and energy efficiency in processing. It should be noted that the standard value applying section 30 can also output standard values for other necessary parameters.

The color noise amount calculated as described above by the function calculation section 33 is transferred to the color noise reducing section 13.

Next, an example of a configuration of the color noise reducing section 13 is described with reference to FIG. 8.

The color noise reducing section 13 comprises a local region extraction section 41 that extracts a local region of a predetermined size in a predetermined position from the image buffer 8, a buffer 42 for storing image data of the local region extracted by the local region extraction section 41, a color difference calculation section 43, which is calculation means for calculating a color difference from image data stored in the buffer 42, an average color difference calculation section 44, which is calculation means for calculating an average color difference based on color differences calculated by the color difference calculation section 43, an allowable range setting section 45, which is setting means for setting an allowable range (a small amplitude value) relating to a color difference based on the average color difference calculated by the average color difference calculation section 44 and the color noise amount estimated by the color noise estimation section 14, a color difference correction section 46, which is smoothing means that corrects the color difference outputted from the color difference calculation section 43 based on the allowable range set by the allowable range setting section 45, and an inverse transformation section 47, which is inverse transformation means for inversely transforming the color difference corrected by the color difference correction section 46 to the original RGB signals or the like and outputting the inversely transformed signals to the signal processing section 15.

Furthermore, the control section 18 is bidirectionally connected to the local region extraction section 41, the color difference calculation section 43, the average color difference calculation section 44, the allowable range setting section 45, color difference correction section 46, and the inverse transformation section 47, and is configured to control these sections.

The local region extraction section 41 extracts image signals for each predetermined size from the image buffer 8, in units of 4×4 pixels in the present embodiment for example, according to the control of the control section 18, and transfers the extracted image signals to the buffer 42.

The color difference calculation section 43 reads out the image signals stored in the buffer 42 according to the control of the control section 18 and calculates two types of color difference signals $(R_j-G_{AV})$ and $(B_k-G_{AV})$ (j=1 to 4 and k=1 to 4). As shown in FIG. 3, four each of R and B pixels are present in the 4×4 pixel local region, and therefore four types each of the color difference signals are calculated here. It should be noted that $G_{AV}$ refers to an average value of the G signals in the 4×4 pixels as indicated in formula 1.

The color difference signals calculated by the color difference calculation section 43 are transferred to the average color difference calculation section 44 and the color difference correction section 46 respectively.

Based on the received two types of color difference signals $(R_j-G_{AV})$ and $B_k-G_{AV}$, the average color difference calculation section 44 calculates average color difference values $RG_{AV}$ and $BG_{AV}$ respectively as shown in the following formula 4.

$$RG_{AV} = \sum_{j=1}^{4} \frac{R_j - G_{AV}}{4}$$ [Formula 4]

$$BG_{AV} = \sum_{k=1}^{4} \frac{B_k - G_{AV}}{4}$$

Thus, the average color difference signals $RG_{AV}$ and $BG_{AV}$ calculated by the average color difference calculation section 44 are transferred to the allowable range setting section 45.

Based on color noise amounts $N_{C(R-G)}$ and $N_{C(B-G)}$ relating to the two types of color difference signals $(R_j-G_{AV})$ and $B_k-G_{AV}$) from the color noise estimation section 14 and the average color difference values $RG_{AV}$ and $BG_{AV}$ from the average color difference calculation section 44, the allowable range setting section 45 sets an upper limit U and a lower limit D as the allowable range (small amplitude value) relating to the color noise amount as indicated in the following formula 5.

$$U_{(R-G)} = RG_{AV} + N_{C(R-G)}/2$$

$$D_{(R-G)} = RG_{AV} - N_{C(R-G)}/2$$

$$U_{(B-G)} = BG_{AV} + N_{C(B-G)}/2$$

$$D_{(B-G)} = BG_{AV} - N_{C(B-G)}/2$$ [Formula 5]

Thus, the allowable range U and D calculated by the allowable range setting section 45 is transferred to the color difference correction section 46.

Based on the control of the control section 18, the color difference correction section 46 corrects (by absorbing amplitude components lower than the small amplitude value) the two types of color difference signals $(R_j-G_{AV})$ and $(B_k-G_{AV})$ from the color difference calculation section 43 according to the allowable range U and D from the allowable range setting section 45 and calculates color difference signals $(R_j-G_{AV})'$ and $(B_k-G_{AV})'$ in which color noise is reduced.

At this time, the correction carried out by the color difference correction section 46 is divided into three types, namely, a case where exceeding the upper limit U of the allowable range, a case where within the allowable range, and a case where below the lower limit D of the allowable range.

First, the color difference signal $(R_j-G_{AV})$ is shown in formula 6.

When $(R_j-G_{AV}) > U_{(R-G)}$ $(R_j-G_{AV})' = (R_j-G_{AV}) - N_{C(R-G)}/2$

When $U_{(R-G)} \geq (R_j-G_{AV}) \geq D_{(R-G)}$ $(R_j-G_{AV})' = RG_{AV}$

When $D_{(R-G)} > (R_j-G_{AV})$ $(R_j-G_{AV})' = (R_j-G_{AV}) + N_{C(R-G)}/2$ [Formula 6]

Next, the color difference signal $(B_k-G_{AV})$ is shown in formula 7.

When $(B_k-G_{AV}) > U_{(B-G)}$ $(B_k-G_{AV})' = (B_k-G_{AV}) - N_{C(B-G)}/2$

When $U_{(B-G)} \geq (B_k-G_{AV}) \geq D_{(B-G)}$ $(B_k-G_{AV})' = BG_{AV}$

When $D_{(B-G)} > (B_k - G_{AV})$ $(B_k - G_{AV})' = (B_k - G_{AV}) + N_{C(B-G)}/2$  [Formula 7]

All the two types of color difference signals $(R_j - G_{AV})$ and $(B_k - G_{AV})$ of which four each are present in the 4×4 pixels as described above are corrected based on formula 6 or formula 7.

Thus, color difference signals that have undergone color correction by the color difference correction section 46 are transferred to the inverse transformation section 47.

The inverse transformation section 47 transforms the color difference signals to the original signals, which are RGB signals in the present embodiment.

At this time, since it is desired that the G signals corresponding to the luminance signals are maintained unchanged, correction of the color difference signals is carried out on only the R signals or the B signals, such that a result of correction is transformation in which an R' signal and a B' signal are obtained. In the transformation here, three types (a total of six types) of calculations are carried out corresponding to the three types (a total of six types) of each of the two types of color difference signals $(R_j - G_{AV})$ and $(B_k - G_{AV})$.

First, the color difference signal $(R_j - G_{AV})$ is shown in the following formula 8.

When $(R_j - G_{AV})' = R_j - G_{AV} - N_{C(R-G)}/2$ $R_j' = R_j - N_{C(R-G)}/2$ When $(R_j - G_{AV})' = RG_{AV}$ $R_j' = RG_{AV} + G_{AV}$ When $(R_j - G_{AV})' = R_j - G_{AV} + N_{C(R-G)}/2$ $R_j' = R_j + N_{C(R-G)}/2$  [Formula 8]

Next, the color difference signal $(B_k - G_{AV})$ is shown in formula 9.

When $(B_k - G_{AV})' = B_k - G_{AV} - N_{C(B-G)}/2$ $B_k' = B_k - N_{C(B-G)}/2$ When $(B_k - G_{AV})' = BG_{AV}$ $B_k' = BG_{AV} + G_{AV}$ When $(B_k - G_{AV})' = B_k - G_{AV} + N_{C(B-G)}/2$ $B_k' = B_k + N_{C(B-G)}/2$  [Formula 9]

The formulas 8 and 9 refer to inverse transformation from the color difference signals $(R_j - G_{AV})'$ and $(B_k - G_{AV})'$, in which color noise has been reduced, to the original RGB signals. By carrying out this inverse transformation, R' signals and B' signals having reduced noise and the original G signals are obtained. The thus-obtained RGB signals (R'GB' signals) are transferred to the signal processing section 15.

Furthermore, the processing of the color noise reducing section 13 is carried out synchronously with the calculation of color noise amount in the color noise estimation section 14 according to the control section 18.

It should be noted that in the above description, color noise amounts are estimated using a 4×4 pixel unit, but there is no limitation to this configuration, and it is also possible to have a configuration in which the color noise amounts are estimated using very large regions as units, for example 8×8 pixels or 16×16 pixels. Although the accuracy of color noise estimation is reduced when employing such a configuration, it has the advantage of enabling greater speed in processing.

Furthermore, in the above description, it is assumed that the processing is carried out using hardware, but there is no limitation to this and the processing can be performed using software.

For example, the image signals from the CCD 4 are taken as raw data in an unprocessed state, and information from the control section 18 such as the temperature and gain at the time of shooting and so on are added to the raw data as header information. The raw data with appended header information may be outputted to a processing device such as a computer and the processing may be performed by software in the processing device.

An example of color noise reduction processing using an image processing program in a computer is described with reference to FIG. 9.

When processing starts, first, all the color signals constituted of the raw data and the header information containing information about temperature and gain and so on is read (step S1).

Next, a local region of a predetermined size, for example a local region using 4×4 pixels as a unit, is extracted from the raw data (step S2).

Then, the signals of the extracted local regions are separated into color signals for each color filter and luminance signals and color difference signals are calculated (step S3).

Following this, an average luminance value is calculated as shown in formula 1 and an average color difference value is calculated as shown in formula 4 (step S4).

Further still, parameters such as temperature and gain are obtained from the header information that is read (step S5). If the necessary parameters are not present in the header information here, a predetermined standard value is applied.

Next, a function such as that shown in formula 3 is read in (step S6) and the color noise amount is calculated (step S7) using the average luminance value obtained in step S4 and the parameters such as temperature and gain obtained in step S5.

An upper limit and a lower limit are set (step S8) as the allowable range as shown in formula 5 using the average color difference value obtained in step S4 and the color noise amount obtained in step S7.

The processes of step S4 to step S8 are carried out as described above only one time on a single local region.

Next, correction is carried out (step S9) as shown in formula 6 and formula 7 on the color difference signals obtained in step S3 based on the allowable range obtained in step S8.

Inverse transformation is carried out (step S10) from the color difference signals that are thus corrected to the original signals as shown in the formulas 8 and 9.

After this, a judgment is made (step S11) as to whether or not processing has finished concerning all the color difference signals in the local region, and when this is not yet finished, the procedure proceeds to step S9 and processing is carried out as described above on the next color difference signals.

On the other hand, when a judgment is made in step S11 that processing is finished concerning all the color difference signals, a further judgment is made (step S12) as to whether or not processing has finished on all the local regions.

Here, when processing has not finished concerning all the local regions, the procedure proceeds to step S2 and processing is carried out concerning as described above with regard to the next local region.

Furthermore, when a judgment is made that processing is finished concerning all the local regions in step S12, commonly known enhancing process, compression process and the like are carried out (step S13).

Then, after the processed signals are outputted (step S14), the series of processes is finished.

With embodiment 1, color noise amounts are estimated using parameters that vary dynamically such as the average luminance value and the temperature and gain at the time of shooting, and therefore highly accurate color noise reduction processing can be carried out. And since temperature change detection is carried out using the OB region signal, an image pickup system can be achieved at low cost. Also, when the aforementioned parameters cannot be obtained, the color noise amount is estimated using a standard value, and therefore color noise amount reductions can be carried out reliably. Further still, by intentionally omitting calculation of a portion of the parameters such as the temperature of the image sensor after it has become stable, it is possible to achieve an image pickup system having reduced costs and lower power consumption. Moreover, since the color noise reduction processing sets the allowable range from the color noise amount, reduction processing which is superior in terms of preservation of the original signals can be accomplished. Additionally, since signals that have undergone color noise reduction processing are inversely transformed to the original signals, compatibility with conventional processing systems is maintained and combinations involving various systems are possible. Furthermore, the luminance signals and the color difference signals are obtained matching the arrangement of the Bayer-type color filter, and therefore processing can be carried out at high speed.

Embodiment 2

Figure 10:
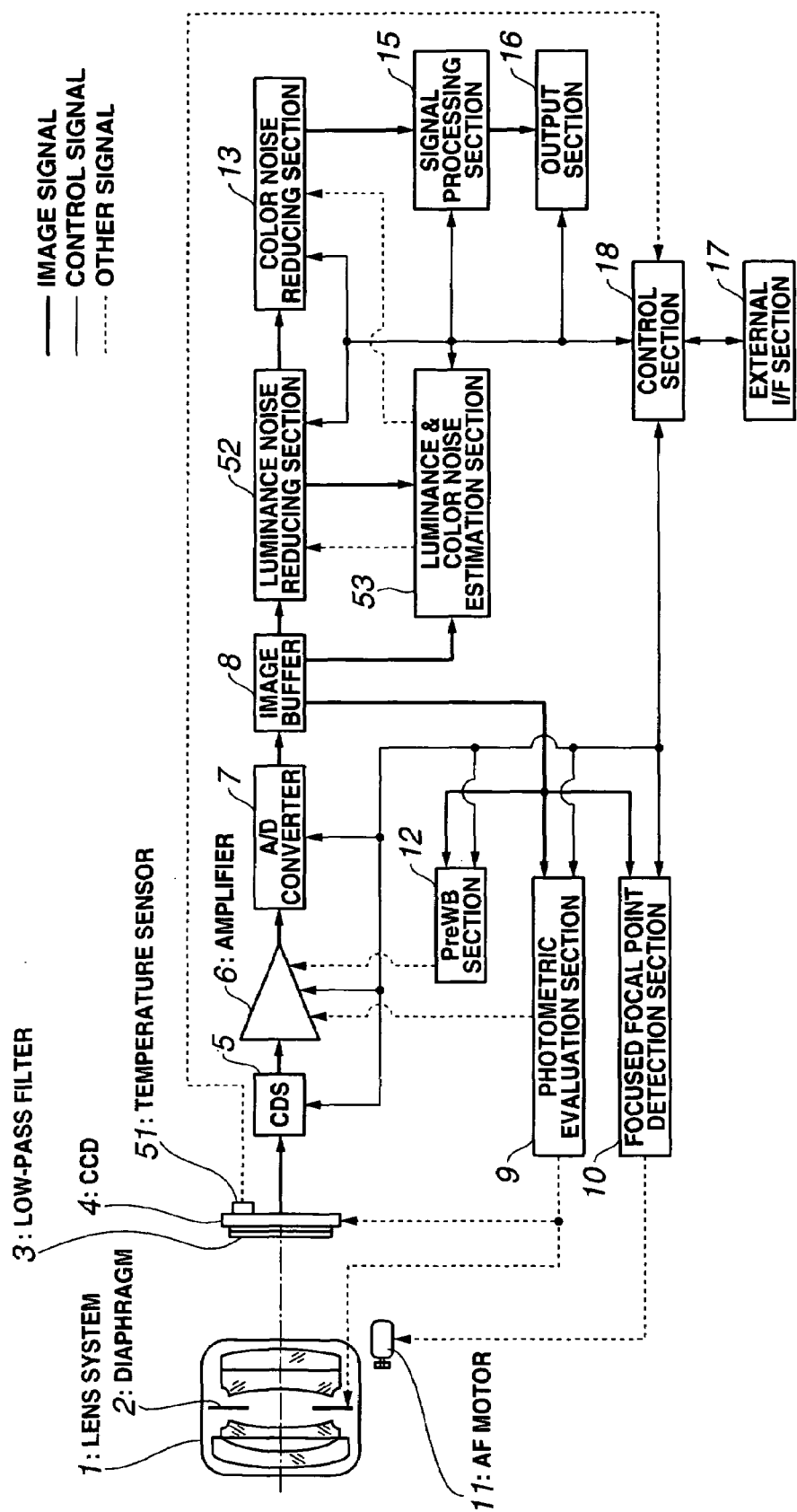
FIG. 10 is a block diagram illustrating a configuration of an image pickup system according to embodiment 2 of the present invention.
Figure 11:
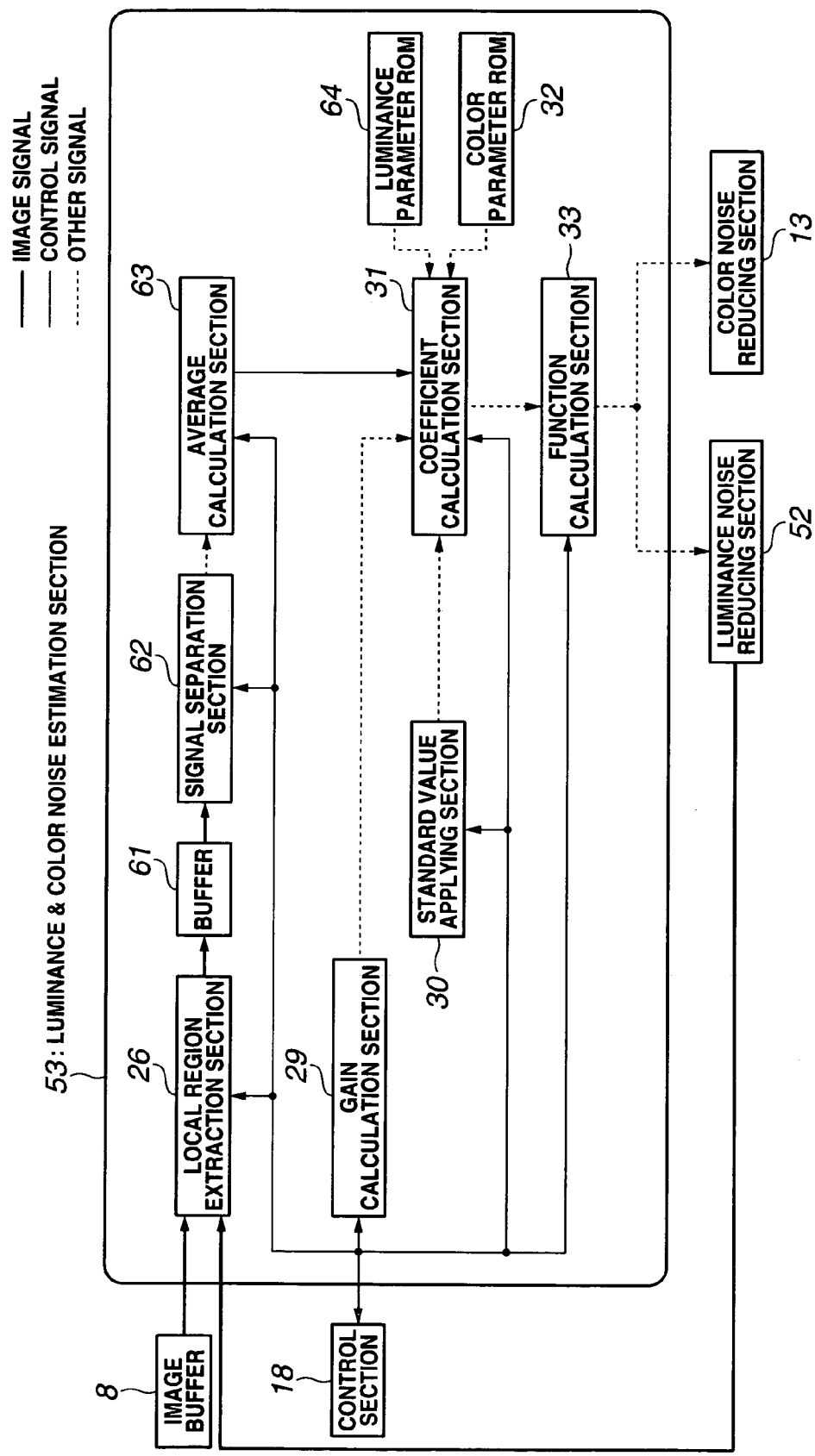
FIG. 11 is a block diagram illustrating an example of a configuration of a luminance and color noise estimation section according to embodiment 2.
Figure 13:
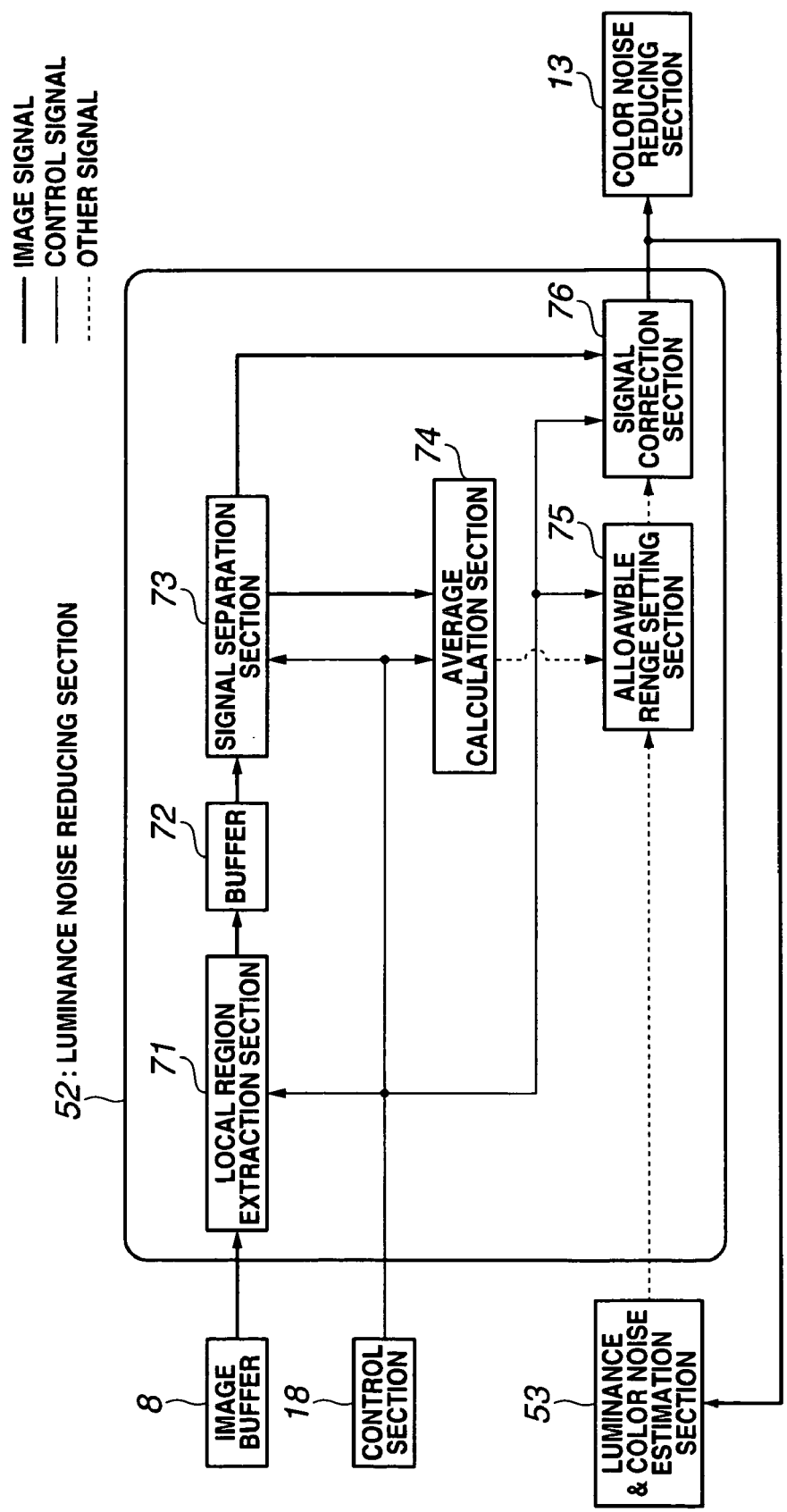
FIG. 13 is a block diagram illustrating a configuration of a luminance noise reducing section according to embodiment 2.
Figure 14:
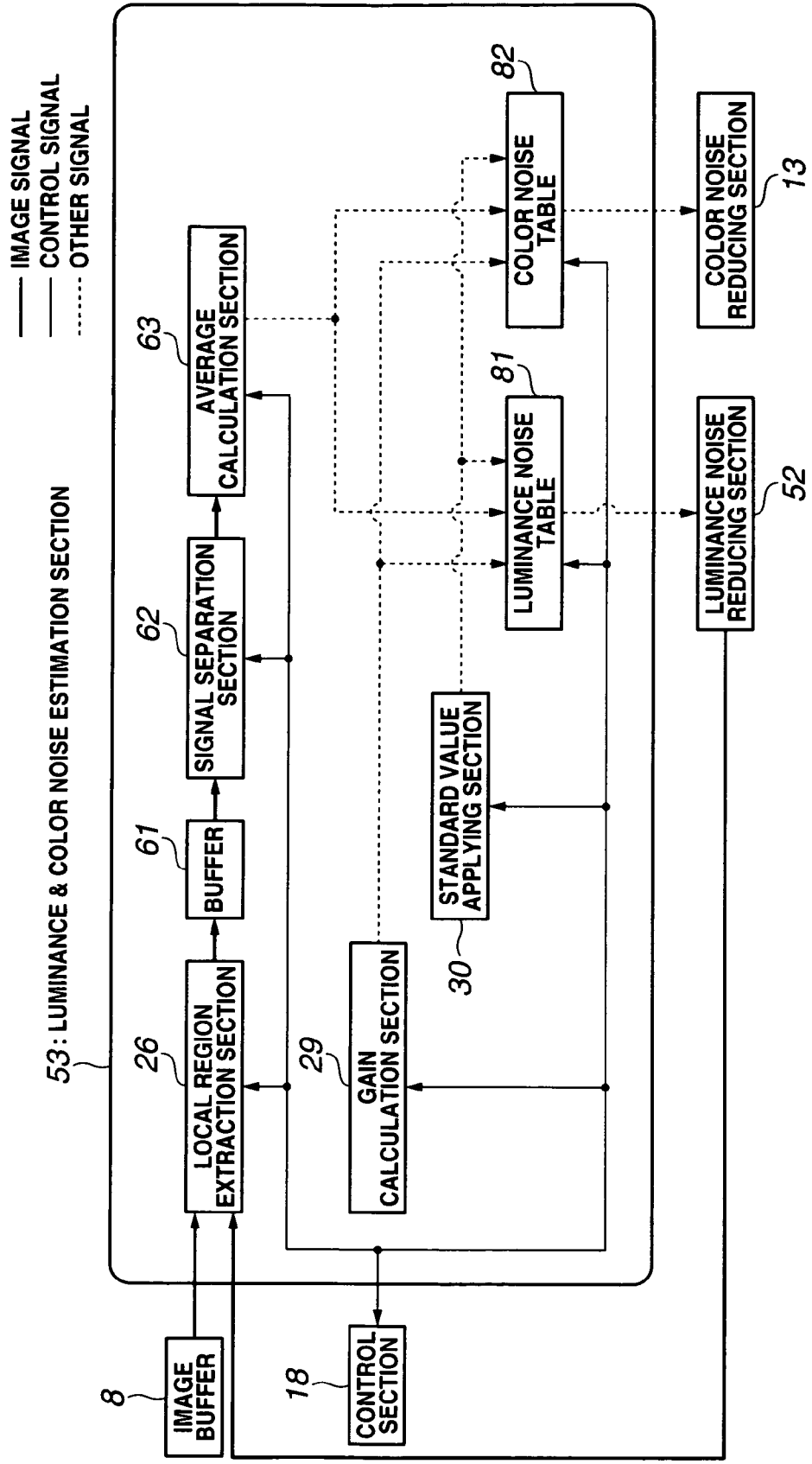
FIG. 14 is a block diagram illustrating another example of a configuration of a luminance and color noise estimation section according to embodiment 2.
Figure 15:
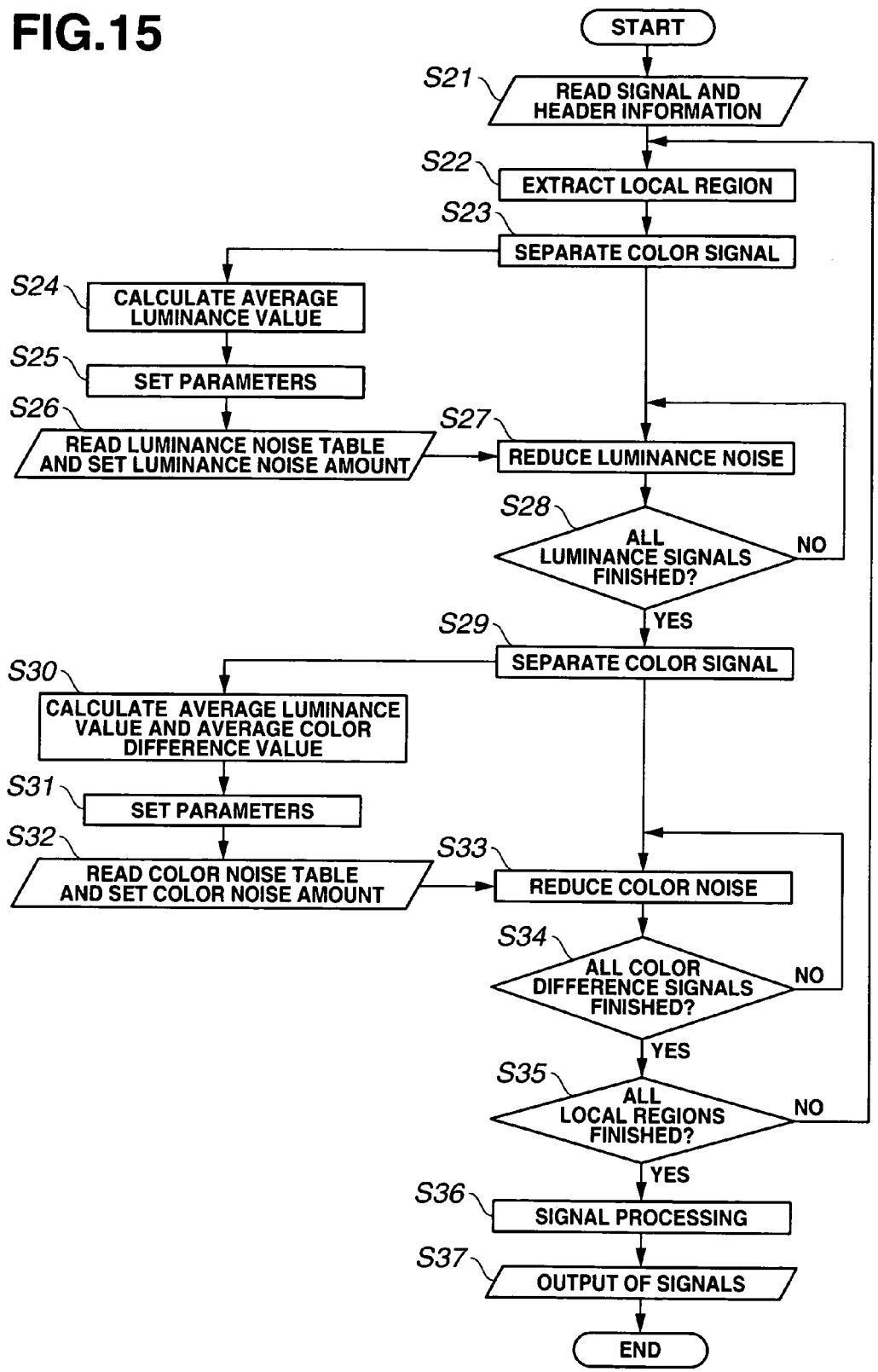
FIG. 15 is a flow chart illustrating a noise reducing process carried out by an image processing program in a computer according to embodiment 2.

FIGS. 10 to 15 illustrate embodiment 2 of the present invention. FIG. 10 is a block diagram illustrating a configuration of an image pickup system, FIG. 11 is a block diagram illustrating an example of a configuration of a luminance and color noise estimation section, FIG. 12A and FIG. 12B illustrate an arrangement of a color-difference line-sequential-type color filter, FIG. 13 is a block diagram illustrating a configuration of a luminance noise reducing section, FIG. 14 is a block diagram illustrating another example of a configuration of a luminance and color noise estimation section, and FIG. 15 is a flow chart illustrating a noise reducing process carried out by an image processing program in a computer.

In the embodiment 2, the same sections are designated by the same reference numerals according to the embodiment 1, and are not described. Mainly, different points are described.

As shown in FIG. 10, in contrast to embodiment 1, the image pickup system of embodiment 2 additionally has a temperature sensor 51, which is arranged near the CCD 4, measures the temperature of the CCD 4 in real time, and outputs a measurement result to the control section 18, thereby constituting parameter calculation means; a luminance & color noise estimation section 53, which is color noise estimation means and luminance noise estimation means for estimating not only the color noise amount but also the luminance noise amount based on the image data stored in the image buffer 8; and a luminance noise reducing section 52, which is luminance noise reducing means, that reduces luminance noise of image data read out from the image buffer 8 based on the luminance noise amount estimated by the luminance & color noise estimation section 53 and outputs to the color noise reducing section 13, and deleted from this configuration is the color noise estimation section 14.

Furthermore, the color noise reducing section 13 receives estimated color noise amounts from the luminance & color noise estimation section 53 instead of the color noise estimation section 14. Further still, the output of the luminance noise reducing section 52 is configured to be inputted also to the luminance & color noise estimation section 53.

The control section 18 is bidirectionally connected to the luminance noise reducing section 52 and the luminance & color noise estimation section 53 and is configured such that it controls these sections.

Additionally, the present embodiment is described using an example in which the CCD 4 is a single CCD having a complementary color filter arranged in front, and this color filter has a color-difference line-sequential-type arrangement as shown in FIG. 12A and FIG. 12B.

A configuration of a color-difference line-sequential-type color filter is described with reference to FIG. 12A and FIG. 12B.

The color-difference line-sequential-type color filter has 2×2 pixels as a basic unit in which one pixel each of cyan (C), magenta (M), yellow (Y), and green (G) are arranged. Note that the positions of the M and G are inverted for each line.

The image signals from the CCD 4 provided with this color filter are separated into an odd number field as shown in FIG. 12A and an even number field as shown in FIG. 12B, then outputted.

Furthermore, the signals saved to the image buffer 8 are not the CMYG signals corresponding to the color filter constructed on the CCD 4, but rather a luminance signal L and color difference signals Cb and Cr, which are converted according to the following formula 10.

$$L = C + M + Y + G$$

$$Cb = C + M - Y - G$$

$$Cr = M + Y - C - G \quad \text{[Formula 10]}$$

Accordingly, it is the luminance signals L and the color difference signals Cb and Cr stored in the image buffer 8 that are transferred to the luminance & color noise estimation section 53 and the luminance noise reducing section 52.

Next, a flow of signals in the image pickup system shown in FIG. 10 that is different from the image pickup system shown in FIG. 1 are substantially as follows.

Shooting conditions such as the white balance coefficient obtained by the pre-white balance section 12, the exposure conditions obtained by the exposure control section 9, the ISO speed set using the external I/F section 17, and the temperature of image sensor from the temperature sensor 51 are transferred via the control section 18 to the luminance & color noise estimation section 53.

Based on this information, the luminance signals, and the color difference signals, the luminance & color noise estimation section 53 calculates the luminance noise amount and the color noise amount, as will be described later, for each predetermined size, for example using 4×4 pixels as a unit in the present embodiment.

The luminance noise amount calculated by the luminance & color noise estimation section 53 is transferred to the luminance noise reducing section 52 and the color noise amount is transferred to the color noise reducing section 13.

The calculations of luminance noise amount and color noise amount by the luminance & color noise estimation section 53 are carried out synchronously with the processes of the luminance noise reducing section 52 and the color noise reducing section 13 according to the control section 18.

Based on the luminance noise amounts transferred from the luminance & color noise estimation section 53, the luminance noise reducing section 52 carries out luminance noise reduction processing on the luminance signals read out from the image buffer 8 and transfers the processed image signals to the luminance & color noise estimation section 53 and the color noise reducing section 13.

The color noise reducing section 13 uses luminance signals in which the luminance noise has been reduced by the luminance noise reducing section 52 and the original color difference signals to carry out color noise reduction processing on the color difference signals according to the color noise amount transferred from the luminance & color noise estimation section 53, then transfers the processed image signals to the signal processing section 15.

Based on the control of the control section 18, the signal processing section 15 generates a single frame of image signals from even number field signals and odd number field signals of the luminance signals that have undergone luminance noise reduction and the color difference signals that have undergone color noise reduction, then carries out processes such as enhancing process, compression process and the like, and transfers to the output section 16.

Next, an example of a configuration of the luminance & color noise estimation section 53 is described with reference to FIG. 11.

The luminance & color noise estimation section 53 has a processing section for luminance noise estimation added to the color noise estimation section 14 shown in FIG. 2 of embodiment 1 and a processing section for temperature estimation is omitted thereof. Then the luminance & color noise estimation section 53 is configured to operate such that it first carries out estimation of the luminance noise amount, outputs the estimation result to the luminance noise reducing section 52, then estimates the next color noise amount using the luminance signal in which luminance noise has been reduced by the luminance noise reducing section 52 and outputs the estimation result to the color noise reducing section 13.

That is, the luminance & color noise estimation section 53 comprises the local region extraction section 26 that extracts local regions of a predetermined size in a predetermined position synchronously with the processing of the luminance noise reducing section 52 based on the image signals stored in the image buffer 8 or the corrected luminance signals from the luminance noise reducing section 52, a buffer 61 for storing signals of the local regions extracted by the local region extraction section 26, a signal separation section 62, which is separation means for separating the luminance signals L and the color difference signals Cb and Cr from the signals of the local region stored in the buffer 61, an average calculation section 63, which is calculation means for calculating an average luminance value from the luminance signals separated by the signal separation section 62, the gain calculation section 29 that calculates the amplification amount of the amplifier 6 according to the exposure conditions transferred from the control section 18 and the white balance coefficient and the like, the standard value applying section 30, which is applying means for applying a standard value when any of the parameters is omitted, the color parameter ROM 32, which is coefficient calculation means for storing the color parameters relating to the function used in estimating the color noise amount, a luminance parameter ROM 64, which is coefficient calculation means for storing the luminance parameters relating to a function that is described later and which is used to estimate the luminance noise amount, the coefficient calculation section 31, which combines color noise amount calculation means, luminance noise amount calculation means, and coefficient calculation means that estimate the color noise amount and luminance noise amount of a target pixel using a predetermined formula based on information such as the parameters read out from the color parameter ROM 32 and the luminance parameter ROM 64, the amplification amount that is outputted from the gain calculation section 29 or the standard value applying section 30, the temperature of the image sensor outputted from the control section 18 or the standard value applying section 30, and the average luminance value outputted from the average calculation section 63, and the function calculation section 33, which combines color noise amount calculation means, luminance noise amount calculation means, and function calculation means that calculate the color noise amount and the luminance noise amount using functions that are formulated in a manner to be described based on the coefficients outputted from the coefficient calculation section 31 and output to the color noise reducing section 13 and the luminance noise reducing section 52.

Furthermore, the control section 18 is bidirectionally connected to the local region extraction section 26, the signal separation section 62, the average calculation section 63, the gain calculation section 29, the standard value applying section 30, the coefficient calculation section 31, and the function calculation section 33, and is configured to control these sections.

The local region extraction section 26 extracts signals of a predetermined size and predetermined position from the image buffer 8 and transfers these to the buffer 61. In the present embodiment, a process of the luminance noise reducing section 52 that is to be described later is carried out using 4×4 pixels as a unit, and therefore the local region extraction section 26 extracts in units of 4×4 pixels while progressively scanning the entire surface of the image. The processing of the local region extraction section 26 is carried out under the control of the control section 18 in synchronization with the processing of the luminance noise reducing section 52.

As described above, the signals stored in the image buffer 8 are divided into an even number field and an odd number field. Accordingly, hereinafter description is given using as an example the odd number field shown in FIG. 12A, but the same is true for the even number field.

Based on the control of the control section 18, the signal separation section 62 separates the luminance signals $L_i$ (i=1 to 6) and the color difference signals $Cb_j$ and $Cr_k$ (j=1 to 3, k=1 to 3), which are stored in the buffer 61.

That is, the luminance signals $L_i$ and the color difference signals $Cr_k$ that are obtained in the first line of the 4×4 pixels stored in the buffer 61 as shown in FIG. 12A are calculated as shown in formula 11 below.

$L_1 = C_1 + M_1 + Y_1 + G_1$ $L_2 = C_2 + M_1 + Y_1 + G_2$ $L_3 = C_2 + M_2 + Y_2 + G_2$ $Cr_1 = M_1 + Y_1 - C_1 - G_1$ $Cr_2 = M_1 + Y_1 - C_2 - G_2$ $Cr_3 = M_2 + Y_2 - C_2 - G_2$ [Formula 11]

Furthermore, the luminance signals $L_i$ and the color difference signals $Cb_j$ that are obtained in the third line of the 4×4 pixels stored in the buffer 61 are calculated as shown in formula 12 below.

$L_4 = C_3 + M_3 + Y_3 + G_3$ $L_5 = C_4 + M_4 + Y_3 + G_3$ $L_6 = C_4 + M_4 + Y_4 + G_4$ $Cb_1 = C_3 + M_3 - Y_3 - G_3$ $$Cb_2 = C_4 + M_4 - Y_3 - G_3$$

$$Cb_3 = C_4 + M_4 - Y_4 - G_4 \quad \text{[Formula 12]}$$

Based on the control of the control section 18, the average calculation section 63 reads out the luminance signals $L_i$ from the buffer 61 and calculates an average luminance value $L_{AV}$ as shown in the following formula 13 and transfers this to the coefficient calculation section 31.

$$L_{AV} = \sum_{i=1}^{6} \frac{L_i}{6} \quad \text{[Formula 13]}$$

On the other hand, the gain calculation section 29 calculates the amplification amount in the amplifier 6 based on information transferred from the control section 18 such as the exposure conditions, the ISO speed, and the white balance coefficient, and transfers a calculation result to the coefficient calculation section 31.

Based on the average luminance value $L_{AV}$ from the average calculation section 63, information about gain from the gain calculation section 29, and temperature of the image sensor measured by the temperature sensor 51 and transferred from the control section 18, the coefficient calculation section 31 estimates the luminance noise amount according to a formulation as shown below in formula 14 and formula 15.

That is, when the luminance level is set as L and the luminance noise amount is set as $N_L$, then:

$$N_L = AL^B + \Gamma \quad \text{[Formula 14]}$$

Or $$N_L = AL^2 + BL + \Gamma \quad \text{[Formula 15]}$$

It should be noted that A, B, and $\Gamma$ in the formulas 14 and 15 are constant terms.

Hereinafter description is given of an example using a formulation according to formula 14, but the same is true when using a formulation according to formula 15.

However, the luminance noise amount $N_L$ is not dependent on only the signal value level L, but also varies for other factors such as the temperature of the image sensor CCD 4 and the gain of the amplifier 6. Accordingly, the following formula 16 is obtained when formulation is carried out giving consideration to these factors.

$$N_L = \alpha(T, G) L^{\beta(T, G)} + \gamma(T, G) \quad \text{[Formula 16]}$$

Here, the temperature is set as T and the gain is set as G, and $\alpha(T, G)$, $\beta(T, G)$, and $\gamma(T, G)$ are functions acting as parameters for the temperature T and the gain G. The specific forms of these functions can easily be acquired by measuring, in advance, the characteristics of the image pickup system including the CCD 4 and the amplifier 6.

The three above-described functions $\alpha(T, G)$, $\beta(T, G)$, and $\gamma(T, G)$ are stored in the luminance parameter ROM 64.

The coefficient calculation section 31 calculates the coefficients A, B, and $\Gamma$ using the three functions $\alpha(T, G)$, $\beta(T, G)$, and $\gamma(T, G)$ stored in the luminance parameter ROM 64 with the temperature T and the gain G as input parameters.

By applying the coefficients A, B, and $\Gamma$ calculated by the coefficient calculation section 31 to formula 16 (or formula 14), the function calculation section 33 determines a form of the function for calculating the luminance noise amount $N_L$. Then, the luminance noise amount $N_L$ is calculated using the signal level L (that is, the average signal level $L_{AV}$ shown in formula 13), which is outputted from the average calculation section 63 via the coefficient calculation section 31.

It should be noted that as is the same in the case of obtaining the color noise amount as described in embodiment 1, it is not absolutely necessary to obtain parameters such as the temperature T and the gain G every shooting.

The luminance noise amount $N_L$ that is calculated by the function calculation section 33 is transferred to the luminance noise reducing section 52. As is described below, the luminance noise reducing section 52 calculates a luminance signal $L'_i$ in which luminance noise has been reduced based on the luminance noise amount $N_L$ that has been transferred.

Next, based on the control of the control section 18, the local region extraction section 26 transfers the luminance signals $L'_i$ from the luminance noise reducing section 52 to the buffer 61.

At this time, the color difference signals, from the color noise reducing section 13, in which color noise has been reduced are not sent to the buffer 61, and therefore present in the buffer 61 are the luminance signals $L'_i$ whose luminance noise has been reduced by the luminance noise reducing section 52 and the original color difference signals $Cb_j$ and $Cr_k$.

Based on the control of the control section 18, the signal separation section 62 separates and reads out the luminance signals $L'_i$ and the color difference signals $Cb_j$ and $Cr_k$ that are stored in the buffer 61.

Based on the control of the control section 18, the average calculation section 63 reads out the luminance signals $L'_i$ from the buffer 61, calculates an average luminance value $L'_{AV}$ as shown in the following formula 17, and transfers this to the coefficient calculation section 31.

$$L'_{AV} = \sum_{i=1}^{6} \frac{L'_i}{6} \quad \text{[Formula 17]}$$

Based on the average luminance value $L'_{AV}$ transferred from the average calculation section 63, the gain, and the temperature of the image sensor, the coefficient calculation section 31 estimates color noise amounts $N_{C(Cb)}$ and $N_{C(Cr)}$. Here, the information of the gain and the temperature of the image sensor is the same as that used when estimating the luminance noise amount as described above, and therefore these may be stored in the standard value applying section 30 and read out from the standard value applying section 30 when estimating the color noise amount.

Furthermore, the two functions a(T, G) and b(T, G) necessary for estimating the color noise amount are recorded separately in the color parameter ROM 32 every two color difference signals Cb and Cr in the same manner as embodiment 1.

The coefficient calculation section 31 calculates the coefficients A and B with the temperature T and the gain G as input parameters using the two functions a(T, G) and b(T, G) recorded in the color parameter ROM 32.

By applying the coefficients A and B calculated by the coefficient calculation section 31 to formula 3 (or formula 2), the function calculation section 33 determines the form of the functions for calculating the color noise amount $N_{C(Cb)}$ and $N_{C(Cr)}$ relating to the two types of color difference signals Cb and Cr. Then, the color noise amounts $N_{C(Cb)}$ and $N_{C(Cr)}$ relating to the color difference signals Cb and Cr are calculated using the signal value level L (that is, the average luminance value $L'_{AV}$ as shown in formula 17) outputted from the average calculation section 63 via the coefficient calculation section 31.

Thus, the color noise amount calculated by the function calculation section 33 is transferred to the color noise reducing section 13.

Next, an example configuration of the luminance noise reducing section 52 is described with reference to FIG. 13.

The luminance noise reducing section 52 comprises a local region extraction section 71 that extracts a local region of a predetermined size from the image buffer 8, a buffer 72 for storing the image data of the local region extracted by the local region extraction section 71, a signal separation section 73 serving as means for separating luminance signals and color difference signals from the image signals stored in the buffer 72, an average calculation section 74 that calculates an average luminance value based on the luminance signals separated by the signal separation section 73, an allowable range setting section 75, which is setting means for setting an allowable range (a small amplitude value) relating to luminance based on the average luminance value calculated by the average calculation section 74 and the luminance noise amount estimated by the luminance & color noise estimation section 53, and a signal correction section 76, which is smoothing means, that corrects the luminance signals outputted by the signal separation section 73 based on the allowable range set by the allowable range setting section 75 and outputs these to the color noise reducing section 13 and the luminance & color noise estimation section 53.

Furthermore, the control section 18 is bidirectionally connected to the local region extraction section 71, the signal separation section 73, the average calculation section 74, the allowable range setting section 75, and the signal correction section 76, and is configured to control these sections.

Based on the control of the control section 18, the local region extraction section 71 extracts image signals from the image buffer 8 for each predetermined size, for example, for each 4×4 pixels in the present embodiment, and transfers the extracted image signals to the buffer 72.

As described above, the image signals stored in the image buffer 8 are divided into an even number field and an odd number field, and although description is given hereinafter using as an example the odd number field shown in FIG. 12A, the same is true for the even number field.

Based on the control of the control section 18, the signal separation section 73 separates the luminance signals $L_i$ (i=1 to 6) and the color difference signals $Cb_j$ and $Cr_k$ (j=1 to 3, k=1 to 3) from the image signals stored in the buffer 72. Then, the separated luminance signals $L_i$ therein are transferred to the average calculation section 74 and the signal correction section 76 respectively. It should be noted that the color difference signals $Cb_j$ and $Cr_k$ are sent as they are to the color noise reducing section 13 via the signal correction section 76.

The average calculation section 74 calculates the average luminance value $L_{AV}$ based on the aforementioned formula 13 and the calculated average luminance value $L_{AV}$ is transferred to the allowable range setting section 75.

Based on the control of the control section 18, the allowable range setting section 75 sets an upper limit U and a lower limit D as the allowable range (small amplitude value) relating to the luminance noise amount based on the luminance noise amount $N_L$ relating to the luminance signals from the luminance & color noise estimation section 53 and the average luminance value $L_{AV}$ from the average calculation section 74 as indicated in the following formula 18.

$$U_L = L_{AV} + N_L/2, D_L = L_{AV} - N_L/2 \quad \text{[Formula 18]}$$

Thus, the allowable range U and D calculated by the allowable range setting section 75 is transferred to the signal correction section 76.

Based on the control of the control section 18, the signal correction section 76 corrects (by absorbing amplitude components lower than the small amplitude value) the luminance signals $L_i$ from the signal separation section 73 according to the allowable range U and D from the allowable range setting section 75 and calculates luminance signals $L'_i$ in which luminance noise is reduced.

At this time, the correction carried out by the signal correction section 76 is divided into three types, namely, a case where exceeding the upper limit U of the allowable range, a case where within the allowable range, and a case where below the lower limit D of the allowable range, and is carried out as shown in the following formula 19.

When $L_i > U_L$, $L'_i = L_i - N_L/2$

When $U_L \geq L_i \geq D_L$, $L'_i = L_{AV}$

When $D_L > L_i$, $L'_i = L_i + N_L/2$ [Formula 19]

There are six types of the luminance signals $L_i$ in the 4×4 pixels, and correction based on formula 19 is carried out on all these luminance signals.

Thus, the luminance signals $L_i$ that have undergone correction by the signal correction section 76 and the original color difference signals $Cb_j$ and $Cr_k$ are transferred to the color noise reducing section 13.

The color noise reducing section 13 carries out color noise reduction based on the color noise amounts $N_{C(Cr)}$ and $N_{C(Cb)}$ in the same manner as embodiment 1.

Namely, first, an average color difference value $Cb_{AV}$ relating to the color difference signal $Cb_j$ and an average color difference value $Cr_{AV}$ relating to the color difference signal $Cr_k$ are calculated as indicated in the following formula 20.

$$Cb_{AV} = \sum_{j=1}^{3} \frac{Cb_j}{3} \quad \text{[Formula 20]}$$

$$Cr_{AV} = \sum_{k=1}^{3} \frac{Cr_k}{3}$$

Next, based on the thus-calculated average color difference values $Cb_{AV}$ and $Cr_{AV}$ and the color noise amounts $N_{C(Cb)}$ and $N_{C(Cr)}$ transferred from the luminance & color noise estimation section 53, the upper limit U and the lower limit D are set as indicated by the following formula 21 as the allowable range for color noise amounts.

$U_{(Cb)} = Cb_{AV} + N_{C(Cb)}/2$ $D_{(Cb)} = Cb_{AV} - N_{C(Cb)}/2$ $U_{(Cr)} = Cr_{AV} + N_{C(Cr)}/2$ $D_{(Cr)} = Cr_{AV} - N_{C(Cr)}/2$ [Formula 21]

Then, correction is carried out on the color difference signals $Cb_j$ and $Cr_k$ based on these allowable ranges and color difference signals $Cb'_j$ and $Cr'_k$ in which color noise has been reduced are calculated respectively by the following formula 22 and formula 23.

When $Cb_j > U_{(Cb)}$, $Cb_j' = Cb_j - N_{C(Cb)}/2$

When $U_{(Cb)} \geq Cb_j \geq D_{(Cb)}$, $Cb_j' = Cb_{AV}$

When $D_{(Cb)} > Cb_j$, $Cb_j' = Cb_j + N_{C(Cb)}/2$ [Formula 22]

When $Cr_k > U_{(Cr)}$, $Cr_k' = Cr_k - N_{C(Cr)}/2$

When $U_{(Cr)} \geq Cr_k \geq D_{(Cr)}$, $Cr_k' = Cr_{AV}$

When $D_{(Cr)} > Cr_k$, $Cr_k' = Cr_k + N_{C(Cr)}/2$ [Formula 23]

In this way, the luminance signals $L'_i$ in which luminance noise has been reduced by the luminance noise reducing section 52 and the color difference signals $Cb_j'$ and $Cr_k'$ in which color noise has been reduced by the color noise reducing section 13 are transferred to the signal processing section 15.

It should be noted that description is given above using an example of a complementary color-based color-difference line-sequential-type single CCD, but of course there is no limitation to this and, for example, a primary color Bayer-type single CCD may be used as is described in embodiment 1, and additionally it is possible a two CCD or a three CCD. For example, when using the primary color Bayer-type image sensor of these, the G signal may be used as the luminance signal and $(R-G_{AV})$ and $(B-G_{AV})$ may be used as the color difference signals.

Furthermore, the aforementioned luminance & color noise estimation section 53 carries out calculations using functions to estimate the luminance noise amounts and the color noise amounts, but there is no limitation to this, and a configuration using a look-up table for example is also possible.

A configuration example of the luminance & color noise estimation section 53 is described with reference to FIG. 14.

The basic construction of the luminance & color noise estimation section 53 shown in FIG. 14 is similar to that of the luminance & color noise estimation section 53 shown in FIG. 11, however, this embodiment differs from the FIG. 11 in that a luminance noise table 81 and a color noise table 82 is provided instead of the coefficient calculation section 31, the color parameter ROM 32, the function calculation section 33, and the luminance parameter ROM 64.

That is to say, the luminance noise table 81 constituting look-up table means and luminance noise amount calculation means, and the color noise table 82 constituting look-up table means and color noise amount calculation means input information from the abovementioned average calculation section 63, gain calculation section 29 and standard value applying section 30.

Furthermore, the output of the luminance noise table 81 is inputted to the luminance noise reducing section 52 and the output of the color noise table 82 is inputted to the color noise reducing section 13.

Also, the control section 18 is bidirectionally connected to the luminance noise table 81 and the color noise table 82, and is configured to control these tables.

Next, areas of the function of the luminance & color noise estimation section 53 shown in FIG. 14 that are different than the function of the luminance & color noise estimation section 53 shown in FIG. 11 are mainly as follows.

Based on the control of the control section 18, the average calculation section 63 calculates the average luminance value $L_{AV}$ as shown in formula 13 and first transfers this to the luminance noise table 81.

Similarly, gain information from the gain calculation section 29 and information relating to the temperature of the image sensor from the control section 18 are respectively transferred to the luminance noise table 81.

The luminance noise table 81 is a table that records luminance noise amounts for the parameters of luminance level, temperature, and gain, which are calculated in advance based on formulation of the luminance noise as shown in formula 16.

Consequently, it is possible to directly obtain luminance noise amounts from the luminance noise table 81 according to the transferred data.

Thus, luminance noise amounts obtained by referencing the luminance noise table 81 are transferred to the luminance noise reducing section 52.

When processing by the luminance noise reducing section 52 is carried out using the transferred luminance noise amounts, the processing results are transferred to the local region extraction section 26 where as described above processing is carried out.

As a result, based on the control of the control section 18, the average calculation section 63 calculates the average luminance value $L'_{AV}$ after luminance noise reduction has been carried out as shown in formula 17, then transfers this to the color noise table 82.

Similarly, gain information from the gain calculation section 29 (or the standard value applying section 30) and information relating to the temperature of the image sensor from the control section 18 (or the standard value applying section 30) are transferred to the color noise table 82 respectively.

The color noise table 82 is a table that records color noise amounts for the parameters of luminance level, temperature, and gain, which are calculated in advance based on formulation of the color noise as shown in formula 3.

Consequently, it is possible to directly obtain color noise amounts from the color noise table 82 according to the transferred data.

Thus, color noise amounts obtained by referencing the color noise table 82 are transferred to the color noise reducing section 13.

With a configuration using the luminance noise table 81 and the color noise table 82, the computational processing for calculating the luminance noise and color noise can be omitted and therefore processing can be achieved at higher speeds.

Furthermore, the above-described processes, which are assumed to be executed using hardware, can also be performed using software in a processing device such as a computer in the same manner as embodiment 1.

An example of carrying out noise reduction processing using an image processing program on a computer is described with reference to FIG. 15.

When processing starts, first, all the color signals constituted of the raw data and the header information containing information about temperature and gain and so on is read (step S21).

Next, a local region of a predetermined size, for example a local region using 4×4 pixels as a unit, is extracted from the raw data (step S22).

Then, the signals of the extracted local regions are separated into luminance signals and color difference signals (step S23).

Following this, an average luminance value is calculated as shown in formula 13 (step S24).

Further still, parameters such as temperature and gain are obtained from the header information that is read (step S25). If the necessary parameters are not present in the header information here, a predetermined standard value is applied.

Next, a table relating to luminance noise amounts is read in and the luminance noise amount is obtained using the average luminance value obtained in step S24 and the parameters such as temperature and gain obtained in step S25 (step S26).

The processes in the above-described step S23 to step S26 are carried out one time only on a single local region.

An upper limit and a lower limit are set as the allowable range by carrying out the calculation shown in formula 18 based on the luminance noise amount obtained in step S26, and correction is carried out as shown in formula 19 on the luminance signals obtained in step S23 (step S27).

Then, a judgment is made as to whether or not processing has finished concerning all the luminance signals in the local region (step S28), and when this is not yet finished, the procedure proceeds to step S27 and processing is carried out as described above on the next luminance signals.

On the other hand, when a judgment is made in step S28 that processing is finished concerning all the luminance signals, then the luminance signals whose luminance noise has been corrected and the original color difference signals are separated (step S29).

After this, the average luminance value is calculated as shown in formula 17 and the average color difference value is calculated as shown in formula 20 (step S30).

Further still, parameters such as temperature and gain are obtained from the header information that has been read in (step S31). If the necessary parameters are not present in the header information here, a predetermined standard value is applied. in the same manner as described above.

Next, the table relating to color noise amounts is read and the color noise amount is obtained using the average luminance value obtained in step S30 and parameters such as temperature and gain obtained in step S31 (step S32).

The upper limit and lower limit are set as the allowable range by carrying out calculation as shown in formula 21 based on the average color difference value obtained in step S30 and the color noise amount obtained in step S32, and correction is carried out as shown in formula 22 and formula 23 on the color difference signals obtained in step S29 (step S33).

Then, a judgment is made as to whether or not processing has finished concerning all the color difference signals in the local region (step S34), and when this is not yet finished, the procedure proceeds to step S33 and processing is carried out as described above on the next color difference signals.

On the other hand, when a judgment is made in step S34 that processing is finished concerning all the color difference signals, a judgment is made as to whether or not processing has finished on all the local regions (step S35). Here, when it is judged that processing has not finished, the procedure proceeds to step S22 and processing is carried out concerning as described above with regard to the next local region.

Furthermore, when a judgment is made in step S35 that processing is finished concerning all the local regions, commonly known enhancing process, compression process and the like are carried out (step S36).

Then, after the processed signals are outputted (step S37), the series of processes is finished.

With embodiment 2, luminance noise amounts and color noise amounts are estimated using parameters that vary dynamically such as the average luminance value and the temperature and gain at the time of shooting, and therefore highly accurate luminance noise reduction processing and color noise reduction processing can be carried out. And since temperature change detection is carried out using a dedicated sensor, noise amounts can be estimated with high accuracy. Also, when the aforementioned parameters cannot be obtained, the luminance noise amount and the color noise amount are estimated using standard values, and therefore luminance noise reductions and color noise amount reductions can be carried out reliably. Further still, by intentionally omitting calculation of a portion of the parameters such as the temperature of the image sensor after it has become stable, it is possible to achieve an image pickup system having reduced costs and lower power consumption. Moreover, since the luminance noise reduction processing sets the allowable range from the luminance noise amount, reduction processing which is superior in terms of preservation of the original signals can be accomplished. Additionally, since the color noise reduction processing sets the allowable range from the color noise amount, reduction processing which is superior in terms of preservation of the original signals can be accomplished. Furthermore, the luminance signals and the color difference signals are obtained matching the arrangement of the color-difference line-sequential-type color filter, and therefore processing can be carried out at high speed.

It should be noted that the present invention is not limited to the above-described embodiments and various modifications and applications will of course become possible without departing from the scope thereof.

What is claimed is:

1. An image pickup system for noise reduction processing on signals from an image sensor, in front of which is arranged a color filter, said system comprising:
   calculation means for calculating luminance signals and color difference signals from the signals in each of predetermined unit regions, calculating an average luminance value based on the calculated luminance signals for each predetermined unit region, and calculating an average color difference value based on the calculated color difference signals for each predetermined unit region,
   color noise estimation means for estimating a color noise amount related to the color difference signals for each predetermined unit region based on the average luminescence value, and
   color noise reducing means for reducing color noise in the color difference signals based on the color noise amount and the average color difference value.

2. The image pickup system according to claim 1, wherein the color filter is one of a primary color filter and a complementary color filter.

3. The image pickup system according to claim 1,
   wherein the color filter is a Bayer-type primary color filter constituted of R (red), G (green), and B (blue),
   wherein the calculation means calculates a G pixel average value $G_{AV}$ as the average luminance value, calculates as the color difference signals a color difference signal $R-G_{AV}$ for each R pixel in the predetermined unit region and a color difference signal $B-G_{AV}$ for each B pixel in the predetermined unit region, and calculates an average color difference value $RG_{AV}$ based on the calculated color difference signal $R-G_{AV}$ and an average color difference value $BG_{AV}$ based on the calculated color difference signal $B-G_{AV}$ as the average color difference values,
   wherein the color noise estimation means estimates a color noise amount related to the color difference signal $R-G_{AV}$ and the color difference signal $B-G_{AV}$ based on the average luminance value $G_{AV}$, and
   wherein the color noise reducing means reduces color noise in the color difference signal $R-G_{AV}$ and color noise in the color difference signal $B-G_{AV}$ respectively based on the color noise amount and on the average color difference value $RG_{AV}$ and the average color difference value $BG_{AV}$.

4. The image pickup system according to claim 1,
wherein the color filter is a color-difference line-sequential-type complementary color filter of C (cyan), M (magenta), Y (yellow), and G (green),
wherein the calculation means calculates a luminance signal L=C+M−Y−G as the luminance signal, calculates a color difference signal Cb=C+M−Y−G and a color difference signal Cr=M+Y−C−G as the color difference signal, calculates an average luminance value $L_{AV}$ as the average luminance value, and calculates an average color difference value $Cb_{AV}$ and an average color difference value $Cr_{AV}$ as the average color difference values, and
wherein the color noise estimation means estimates a color noise amount related to the color difference signals Cb and Cr based on the average luminance value $L_{AV}$, and
wherein the color noise reducing means reduces color noise in the color difference signal Cb and the color difference signal Cr respectively based on the color noise amount and on the average color difference values $Cb_{AV}$ and $Cr_{AV}$.

5. The image pickup system according to claim 1, wherein the predetermined unit region is a region of a unit of 4×4 pixels.

6. The image pickup system according to claim 1, further comprising:
separation means for separating from the signals the luminance signal or the color signal for each color filter,
luminance noise estimation means for estimating a luminance noise amount in the color signals or the luminance signal for each predetermined unit region, and
luminance noise reducing means for reducing luminance noise in the color signals or the luminance signals based on the luminance noise amount for each predetermined unit region,
wherein the calculation means calculates luminance signals and color difference signals for each of predetermined unit regions based on signals in which luminance noise has been reduced by the luminance noise reducing means.

7. The image pickup system according to claim 1, wherein the color noise estimation means comprises:
parameter calculation means for obtaining a parameter based on information of at least one of the average luminance value,
a temperature of the image sensor, and a gain with respect to the signals, and
color noise amount calculation means for obtaining a color noise amount based on the parameter.

8. The image pickup system according to claim 6, wherein the luminance noise estimation means comprises:
parameter calculation means for obtaining a parameter based on information of at least one of an average value of the color signals, an average value of the luminance signals, a temperature of the image sensor, and a gain with respect to the signals, and
luminance noise amount calculation means for obtaining a luminance noise amount based on the parameter.

9. The image pickup system according to claim 7, wherein the parameter calculation means comprises a temperature sensor for measuring a temperature of the image sensor.

10. The image pickup system according to claim 8, wherein the parameter calculation means comprises a temperature sensor for measuring a temperature of the image sensor.

11. The image pickup system according to claim 7, wherein, the image sensor comprises an OB (optical black) region, and the parameter calculation means comprises variance calculation means for determining variance of signals in the OB (optical black) region in the image sensor, and with temperature estimation means for estimating a temperature of the image sensor based on the variance.

12. The image pickup system according to claim 8, wherein, the image sensor comprises an OB (optical black) region, and the parameter calculation means comprises variance calculation means for determining variance of signals in the OB (optical black) region in the image sensor, and with temperature estimation means for estimating a temperature of the image sensor based on the variance.

13. The image pickup system according to claim 7, wherein the parameter calculation means comprises gain calculation means for determining the gain based on information of at least one of an ISO speed, exposure information, and white balance information.

14. The image pickup system according to claim 8, wherein the parameter calculation means comprises gain calculation means for determining the gain based on information of at least one of an ISO speed, exposure information, and white balance information.

15. The image pickup system according to claim 7,
wherein the parameter calculation means is configured to calculate as parameters an average luminance value L, a temperature T of the image sensor, and a gain G of the signals,
wherein the color noise estimation means further comprises applying means for applying a standard parameter value in regard to parameters unobtainable from the parameter calculation means, and
wherein the color noise amount calculation means calculates a color noise amount $N_C$ using a parameter obtained from the parameter calculation means or the applying means, and comprises:
 (i) coefficient calculation means for calculating two coefficients A and B based on two functions a (T, G) and b (T, G) using the temperature T and the gain G as parameters; and
 (ii) function calculation means for calculating the color noise amount $N_C$ based on a functional equation $N_C$=AL+B defined by the two coefficients A and B calculated by the coefficient calculation means.

16. The image pickup system according to claim 7,
wherein the color noise estimation means further comprises applying means for applying a standard parameter value in regard to parameters unobtainable from the parameter calculation means, and
wherein the color noise amount calculation means comprises look-up table means for obtaining a color noise amount based on an average luminance value, a temperature of the image sensor, and a gain of the signals, which are obtained from the parameter calculation means or the applying means.

17. The image pickup system according to claim 8,
wherein the parameter calculation means is configured to calculate as parameters an average value L of the color signals or the luminance signals, a temperature T of the image sensor and a gain G of the signals,
wherein the luminance noise estimation means further comprises applying means for applying a standard parameter value in regard to parameters unobtainable from the parameter calculation means, and
wherein the luminance noise amount calculation means calculates a luminance noise amount $N_L$ using a parameter obtained from the parameter calculation means or the applying means, and comprises:
  (i) coefficient calculation means for calculating three coefficients A, B, and Γ based on three functions α(T, G), β(T, G), and γ(T, G) using the temperature T and the gain G parameters; and
  (ii) function calculation means for calculating the luminance noise amount $N_L$ based on either a first functional equation $N_L=AL^B+\Gamma$ or a second functional equation $N_L=AL^2+BL+\Gamma$ defined by the three coefficients A, B, and Γ calculated by the coefficient calculation means.

18. The image pickup system according to claim 8, wherein the luminance noise estimation means further comprises applying means for applying a standard parameter value in regard to parameters unobtainable from the parameter calculation means, and the luminance noise amount calculation means comprises look-up table means for obtaining a luminance noise amount based on an average value of the color signals or an average value of the luminance signals, a temperature of the image sensor, and a gain of the signals, which are obtained from the parameter calculation means or the applying means.

19. The image pickup system according to claim 1, wherein the color noise reducing means comprises:
  setting means for setting a small amplitude value for each predetermined unit region based on a color noise amount from the color noise estimation means, and
  smoothing means for absorbing amplitude components less than the small amplitude value with respect to the color difference signals.

20. The image pickup system according to claim 6, wherein the luminance noise reducing means comprises:
  setting means for setting a small amplitude value for each predetermined unit region based on a luminance noise amount from the luminance noise estimation means, and
  smoothing means for absorbing amplitude components less than the small amplitude value with respect to the color signals or the luminance signal.

21. The image pickup system according to claim 1, further comprising inverse transformation means for inversely transforming color difference signals, in which color noise has been reduced by the color noise reducing means, to signals of a same type as signals from the image sensor.

22. An image pickup method for controlling an image pickup system to execute functions comprising:
  calculating luminance signals and color difference signals in each of predetermined unit regions from signals from an image sensor, in front of which is arranged a color filter, calculating an average luminance value based on the calculated luminance signals for each predetermined unit region, and calculating an average color difference value based on the calculated color difference signals for each predetermined unit region,
  estimating a color noise amount related to the color difference signals for each predetermined unit region based on the average luminescence value, and
  reducing color noise in the color difference signals based on the color noise amount and the average color difference value.

23. The image pickup method according to claim 22, wherein the image pickup method further controls the image pickup system to execute functions comprising:
  separating luminance signals or color signals in each color filter from the signals from the image sensor,
  estimating a luminance noise amount in the color signals or the luminance signals for each predetermined unit region, and
  a reducing luminance noise in the color signals or the luminance signals based on the luminance noise amount for each predetermined unit region, wherein the luminance signals and color difference signals for each predetermined unit region are calculated based on signals in which luminance noise has been reduced.

24. The image pickup method according to claim 22, wherein a parameter is obtained based on information of at least one of the average luminance value, a temperature of the image sensor, and a gain with respect to the signals, and a color noise amount is obtained based on the parameter.

25. The image pickup method according to claim 24,
  wherein an average luminance value L, a temperature T of the image sensor, and a gain G of the signals are calculated,
  wherein a standard parameter value is applied with regard to parameters unobtainable from the parameter calculation procedure,
  wherein a color noise amount $N_C$ is calculated using an obtained parameter
  wherein two coefficients A and B are calculated based on two functions a(T, G) and b(T, G) using the temperature T and the gain G as parameters; and
  wherein the color noise amount $N_C$ is calculated based on a functional equation $N_C=AL+B$ defined by the two coefficients A and B calculated.

26. The image pickup method according to claim 22, wherein a small amplitude value for each predetermined unit region is set based on a color noise amount, and amplitude components less than the small amplitude value are absorbed with respect to the color signals.

* * * * *

UNITED STATES PATENT AND TRADEMARK OFFICE
CERTIFICATE OF CORRECTION

PATENT NO. : 7,595,825 B2  Page 1 of 1
APPLICATION NO. : 11/447771
DATED : September 29, 2009
INVENTOR(S) : Takao Tsuruoka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Twenty-eighth Day of September, 2010

David J. Kappos
*Director of the United States Patent and Trademark Office*